United States Patent
Campbell et al.

(10) Patent No.: US 10,930,917 B2
(45) Date of Patent: Feb. 23, 2021

(54) ELECTRIC VEHICLE BATTERY CELL HAVING MULTIPLE STACK STRUCTURES

(71) Applicant: SF Motors, Inc., Santa Clara, CA (US)

(72) Inventors: Brennan Campbell, Santa Clara, CA (US); Scott Quinlan Freeman Monismith, Santa Clara, CA (US); Derek Nathan Wong, Santa Clara, CA (US); Yifan Tang, Santa Clara, CA (US); Ying Liu, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 153 days.

(21) Appl. No.: 16/234,253

(22) Filed: Dec. 27, 2018

(65) Prior Publication Data
US 2020/0212410 A1 Jul. 2, 2020

(51) Int. Cl.
| | |
|---|---|
| H01M 2/26 | (2006.01) |
| B60K 1/04 | (2019.01) |
| H01M 10/42 | (2006.01) |
| H01M 10/625 | (2014.01) |
| H01M 2/02 | (2006.01) |

(52) U.S. Cl.
CPC ............ H01M 2/263 (2013.01); B60K 1/04 (2013.01); H01M 2/024 (2013.01); H01M 10/425 (2013.01); H01M 10/625 (2015.04); *H01M 2220/20* (2013.01)

(58) Field of Classification Search
CPC .................................................. H01M 2/1077
See application file for complete search history.

(56) References Cited

U.S. PATENT DOCUMENTS

| | | | | |
|---|---|---|---|---|
| 5,474,859 A | * | 12/1995 | Takeuchi | H01M 10/16 429/161 |
| 6,461,759 B1 | * | 10/2002 | Miller | H01M 4/02 429/94 |
| 7,432,001 B1 | * | 10/2008 | Takeuchi | H01M 6/16 429/3 |
| 7,598,003 B1 | * | 10/2009 | Yoon | H01M 10/0568 429/313 |
| 2001/0033953 A1 | * | 10/2001 | Gan | H01M 6/50 429/9 |
| 2016/0285111 A1 | * | 9/2016 | Norton | H01M 6/42 |
| 2017/0133644 A1 | * | 5/2017 | Robert | H01M 10/613 |
| 2019/0131797 A1 | * | 5/2019 | Chen | H02J 7/0013 |

FOREIGN PATENT DOCUMENTS

EP 0670605 A1 * 9/1995 ............ H01M 6/10

* cited by examiner

*Primary Examiner* — Imran Akram
(74) *Attorney, Agent, or Firm* — Foley & Lardner LLP; James De Vellis

(57) ABSTRACT

Provided herein are systems, apparatuses, and methods of powering electric vehicles. A battery pack can be disposed in an electric vehicle to power the electric vehicle. A housing can be arranged in the battery pack and can have a first polarity terminal. A capping element can be mechanically coupled with the housing and can have a second polarity terminal. A battery cell array can be arranged within a cavity in the housing. The battery cell array can have a first polarity terminal electrically coupled with the housing. The battery cell array can have a second polarity terminal electrically coupled with the capping element.

19 Claims, 11 Drawing Sheets

ELECTRIC VEHICLE BATTERY CELL HAVING MULTIPLE STACK STRUCTURES

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

The present disclosure is directed to housing for battery cells in battery packs of electrical vehicles. A stack structure can include a positive electrode, a negative electrode, and a separator, among other components, to store in a battery pack and provide electrical energy to components connected thereto. Multiple stack structures can be inserted into a single housing, and electrically coupled together in series or parallel. With such a configuration, weight and volume of the battery pack can be reduced, while maintaining or increasing output power.

At least one aspect is directed to a system to power electric vehicles. The system can include a battery pack disposed in an electric vehicle to power the electric vehicle. The system can include a housing arranged in the battery pack. The housing can have a cavity. At least a portion of the housing can have a first polarity terminal. The system can include a capping element mechanically coupled with the housing. The capping element can have a second polarity terminal opposite of the first polarity terminal of the housing. The system can include a battery cell array arranged within the cavity of the housing. The battery cell array can have a first polarity terminal for the battery cell array electrically coupled with the first polarity terminal of the housing. The battery cell array can have a second polarity terminal for the battery cell array electrically coupled with the second polarity terminal of the capping element. The battery cell array can have a first stack structure. The first stack structure can have a first portion and a second portion. The first portion of the first stack structure can have a first polarity terminal of the first stack structure. The second portion of the first stack structure can have a second polarity terminal of the first stack structure. The first polarity terminal of the first stack structure can be electrically coupled with the first polarity terminal for the battery cell array. The stack structure can have a second stack structure. The second stack structure can have a first portion and a second portion. The second stack structure can be axially aligned with the first stack structure within the cavity of the housing. The first portion of the second stack structure can have a first polarity terminal of the second stack structure. The second portion of the second stack structure can have a second polarity terminal of the second stack structure. The second polarity terminal of the second stack structure can be electrically coupled with the second polarity terminal for the battery cell array. The second polarity terminal of the first stack structure can be electrically coupled with one of the first polarity terminal of the second stack structure or the second polarity terminal of the capping element via the second polarity terminal for the battery cell array. The first polarity terminal of the second stack structure can be electrically coupled with at least one of the second polarity of the first stack structure or the first polarity terminal for the battery cell array.

At least one aspect is directed to a method of assembling battery packs. The method can include disposing a battery pack in an electric vehicle to power the electric vehicle. The method can include arranging, in the battery pack, a housing having a cavity. At least a portion of the housing can have a first polarity terminal. The method can include mechanically coupling a capping element with the housing. The capping element can have a second polarity terminal opposite of the first polarity terminal of the housing. The method can include arranging, within the cavity of the housing, a battery cell array. The battery cell array can have a first polarity terminal for the battery cell array electrically coupled with the first polarity terminal of the housing. The battery cell array can have a second polarity terminal for the battery cell array electrically coupled with the second polarity terminal of the capping element. The battery cell array can have a first stack structure. The first stack structure can have a first portion and a second portion. The first portion of the first stack structure can have a first polarity terminal of the first stack structure. The second portion of the first stack structure can have a second polarity terminal of the first stack structure. The first polarity terminal of the first stack structure can be electrically coupled with the first polarity terminal for the battery cell array. The stack structure can have a second stack structure. The second stack structure can have a first portion and a second portion. The second stack structure can be axially aligned with the first stack structure within the cavity of the housing. The first portion of the second stack structure can have a first polarity terminal of the second stack structure. The second portion of the second stack structure can have a second polarity terminal of the second stack structure. The second polarity terminal of the second stack structure can be electrically coupled with the second polarity terminal for the battery cell array. The second polarity terminal of the first stack structure can be electrically coupled with one of the first polarity terminal of the second stack structure or the second polarity terminal of the capping element via the second polarity terminal for the battery cell array. The first polarity terminal of the second stack structure can be electrically coupled with at least one of the second polarity of the first stack structure or the first polarity terminal for the battery cell array.

At least one aspect is directed to an electric vehicle. The electric vehicle can include one or more components. The electric vehicle can include a battery pack to power one or more components. The electric vehicle can include a housing arranged in the battery pack. The housing can have a cavity. At least a portion of the housing can have a first polarity terminal. The electric vehicle can include a capping element mechanically coupled with the housing. The capping element can have a second polarity terminal opposite of the first polarity terminal of the housing. The electric vehicle can include a battery cell array arranged within the cavity of the housing. The battery cell array can have a first polarity terminal for the battery cell array electrically coupled with the first polarity terminal of the housing. The battery cell array can have a second polarity terminal for the battery cell array electrically coupled with the second polarity terminal of the capping element. The battery cell array can have a first stack structure. The first stack structure can have a first portion and a second portion. The first portion of the first stack structure can have a first polarity terminal of the first stack structure. The second portion of the first stack structure can have a second polarity terminal of the first stack structure. The first polarity terminal of the first stack structure can be electrically coupled with the first polarity terminal for the battery cell array. The stack structure can have a second stack structure. The second stack structure can have a first portion and a second portion. The second stack structure can be axially aligned with the first stack structure within the cavity of the housing. The first portion of the second stack structure can have a first polarity terminal of the second stack structure. The second portion of the second stack structure can have a second polarity terminal of the second stack structure. The second polarity terminal of the second stack structure can be electrically coupled with the second polarity terminal for the battery cell array. The second polarity terminal of the first stack structure can be electrically coupled with one of the first polarity terminal of the second stack structure or the second polarity terminal of the capping element via the second polarity terminal for the battery cell array. The first polarity terminal of the second stack structure can be electrically coupled with at least one of the second polarity of the first stack structure or the first polarity terminal for the battery cell array.

At least one aspect is directed to a method. The method can include providing a system. The system can include a battery pack disposed in an electric vehicle to power the electric vehicle. The system can include a housing arranged in the battery pack. The housing can have a cavity. At least a portion of the housing can have a first polarity terminal. The system can include a capping element mechanically coupled with the housing. The capping element can have a second polarity terminal opposite of the first polarity terminal of the housing. The system can include a battery cell array arranged within the cavity of the housing. The battery cell array can have a first polarity terminal for the battery cell array electrically coupled with the first polarity terminal of the housing. The battery cell array can have a second polarity terminal for the battery cell array electrically coupled with the second polarity terminal of the capping element. The battery cell array can have a first stack structure. The first stack structure can have a first portion and a second portion. The first portion of the first stack structure can have a first polarity terminal of the first stack structure. The second portion of the first stack structure can have a second polarity terminal of the first stack structure. The first polarity terminal of the first stack structure can be electrically coupled with the first polarity terminal for the battery cell array. The stack structure can have a second stack structure. The second stack structure can have a first portion and a second portion. The second stack structure can be axially aligned with the first stack structure within the cavity of the housing. The first portion of the second stack structure can have a first polarity terminal of the second stack structure. The second portion of the second stack structure can have a second polarity terminal of the second stack structure. The second polarity terminal of the second stack structure can be electrically coupled with the second polarity terminal for the battery cell array. The second polarity terminal of the first stack structure can be electrically coupled with one of the first polarity terminal of the second stack structure or the second polarity terminal of the capping element via the second polarity terminal for the battery cell array. The first polarity terminal of the second stack structure can be electrically coupled with at least one of the second polarity of the first stack structure or the first polarity terminal for the battery cell array.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
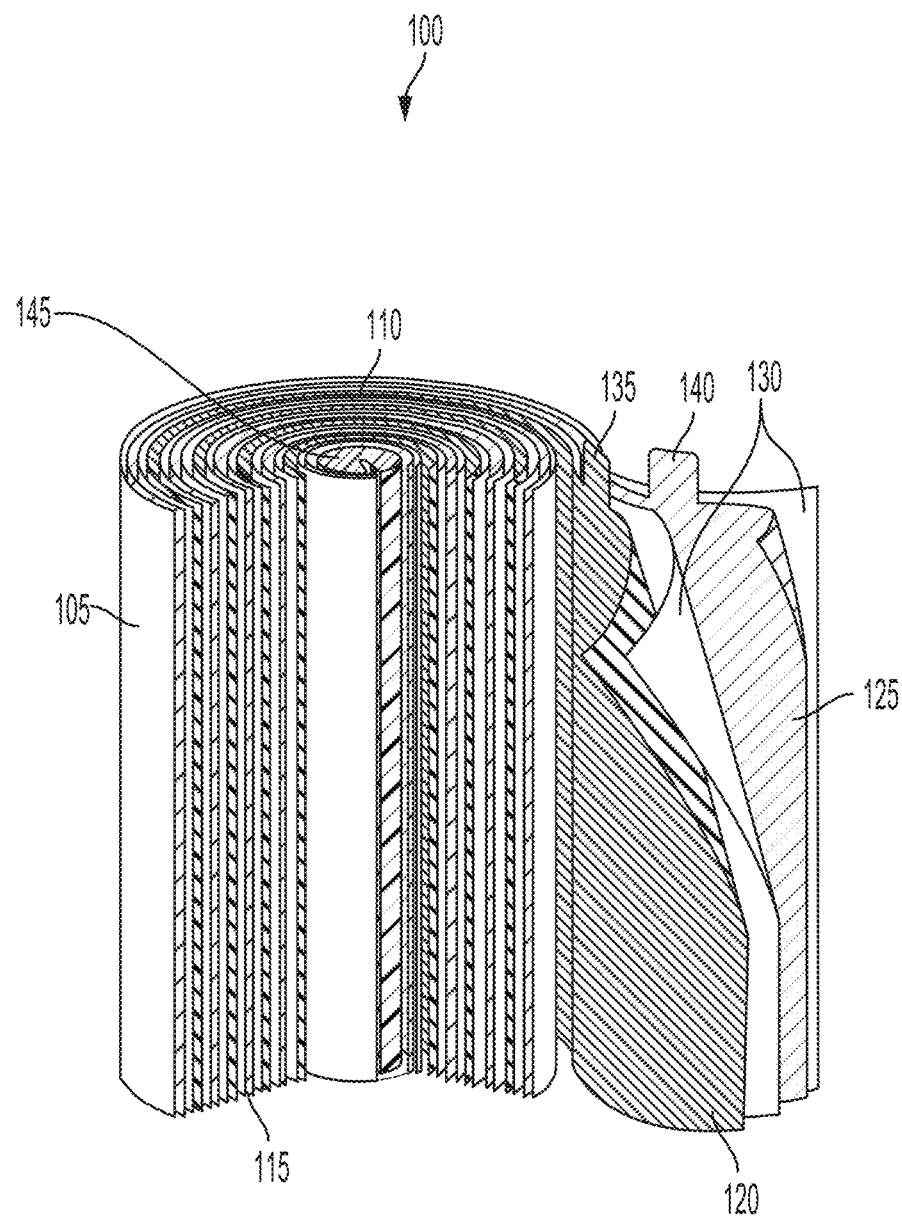
FIG. 1 depicts an isometric view of an example stack structure for powering an electric vehicle.

Following below are more detailed descriptions of various concepts related to, and implementations of battery cells for battery packs in electric vehicles. The various concepts introduced above and discussed in greater detail below can be implemented in any of numerous ways.

Described herein are battery cells for battery packs in electric vehicles for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

Battery cells in the form of cylindrical or prismatic structure arranged together in a battery pack can be used to power components of an electric vehicle or other devices. To increase the voltage outputted by the battery pack, sets of battery cells can be first electrically coupled in parallel within each set and then coupled in series across the different sets. The series connections can function as multipliers for the voltage outputted by the battery pack. For example, the battery pack can contain two battery cells with a capacity of 3 Ah and an output voltage of 3.7V each. A group of such battery cells connected in parallel can have a total capacity of 6 Ah but still an output voltage of 3.7V. Connecting these battery cells in series can result in a total capacity of 3 Ah but the output voltage can be additively increase to 7.4V.

Within the battery pack, each battery cell can include a stack structure of a positive electrode, a negative electrode, a separator, and current collectors (e.g., a jelly roll) encased by a metallic casing (e.g., a can) and topped by a covering element (e.g., a cap). The individual layers of the stack structure can be wound upon into a cylindrical or prismatic geometry, and then placed and welded into the casing. The casing can be enclosed using the covering element, and then can be crimped to form a hermetic seal to secure the stack structure within the casing. The metallic casing can be electrically coupled to the negative electrode in the stack structure and can serve as the negative terminal for the battery cell. On the other hand, the covering element can be electrically coupled to the positive electrode in the stack structure and can serve as the positive terminal for the battery cell.

Myriad technical challenges can arise from attempting the multiply the voltage outputted by the battery pack using such battery cells. When a group of these battery cells are connected in series in the battery pack, the voltage outputted by the battery pack can be multiplied (e.g., to an overall total voltage of 300V to 500V). For one, connecting the battery cells in this fashion, however, can restrict the design and configuration of the battery pack in such a way that each battery cell has a lower resultant output voltage (e.g., less than 3.7V). Consequently, more battery cell modules can be added to the battery pack to achieve the target overall voltage for the battery pack (e.g., ranging between 300V to 500V). For another, the dimensions of the stack structure can result in the use of casings with larger dimensions. This can lead to a significant increase in the weight of the battery pack, especially when numerous battery cells (e.g., hundreds to thousands) are to be housed in the battery pack.

To address the technical challenges stemming from the multiplication of the output voltage from battery packs using such battery cells, multiple stack structures can be inserted into a single housing, rather than using individual casings for each stack structure. The dimensions of the housing can be constructed to accommodate multiple stack structures. For example, the length of the housing can be elongated or deep-drawn to take in multiple stack structures. Prior to insertion into the housing, the multiple stack structures can be electrically coupled together (e.g., via welding or bonding) to form a series or parallel connection. For each additional stack structure added in series, the total output voltage can be multiplied by the additional stack structure. Conversely, for each additional stack structure added in parallel, the total capacity of all the stack structures can be multiplied by the additional stack structure. To achieve the series or parallel connection, the positive and negative tabs of each stack structure can be connected to the positive or negative tabs of other stack structures via one or more conductive conduits (e.g., an electrically conductive wire).

Once each stack structure connected to one another, the entire array of multiple stack structures can be inserted into the cavity of the elongated housing. The stack structures can be separated from one another within the housing to prevent direct electrical coupling between each stack structure within the stack structure array. To separate the stack structures, an indentation or beading can be formed on the surface of the housing between each stack structure at intervals corresponding to lengths of each stack structure. In addition, fixed supports in the form of concentric rings or other shapes can be fitted within the housing (e.g., via gluing or welding) between each stack structure before the insertion. An electrically insulative element (e.g., circular washers) can be also inserted between and around each stack structure to separate from one another and the housing itself prior to the insertion. The electrically insulative elements can be comprised of insulating plastics, such as polyethylene, polypropylene, or polytetrafluoroethylene, among others.

With the multiple stack structures inserted into the cavity of the housing, a capping element can be fitted onto the end of the housing (e.g., using crimping) to cover and secure the stack structures inside the cavity of the housing. The capping element can include a current interrupter device (CID), over-current protector, or a thermal vent to maintain the integrity of the cell array. At least one of the stack structures in the array can be connected with the housing itself to form an electrical coupling with the housing. At least one of the stack structures can be connected with the cap to form an electrical coupling with the covering element. The housing can serve as a negative terminal for the entire stack array and the capping element can serve as a positive terminal for the entire stack array. Several of these entire assemblies can be incorporated into a battery pack for installation in an electric vehicle.

This approach can maintain or increase the total output voltage or total capacity of the battery pack. In addition, as multiple stack structures can be stored in the same housing, the overall weight of the battery pack with the cell array assemblies can be reduced. Furthermore, cell balancing (e.g., switching one or off) within the battery pack can be simplified as multiple stack structures can share the same environment within the single housing. Likewise, thermal control (e.g., cooling to remove heat) within the battery pack can be more efficient with the multiple stack structures contained inside the same housing. Additionally, the time duration for and the complexity of assembling the battery pack can be significantly trimmed down. For example, with more than one stack structure stored in each housing, each battery cell may lack a dedicated wiring to connect to other battery cells or components. In this fashion, the amount and length of wiring used to connect together all the battery cells in the battery pack can be reduced. There can also be fewer exposed wells in the battery pack, thereby increasing the lifespan of the battery pack. In addition, more flexible designs and configurations for the battery pack can be now possible. For instance, some of the housings for the stack structures can be vertically oriented, while others can be horizontally oriented.

FIG. 1, among others, depicts an isometric view of a stack structure 100 for powering an electric vehicle. The stack structure 100 (e.g., a jellyroll or a Swiss roll) can store and provide electrical energy. The stack structure 100 can be for a battery cell of any type, such as a lithium ion battery cell, a lithium-air battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The stack structure 100 can have a portion (e.g., a layer, tab, member, or some other substructure) having or corresponding to a positive terminal for the stack structure 100. The stack structure 100 can also have a portion (e.g., a layer, tab, member or some other substructure) having or corresponding to a negative terminal for the stack structure 100. The stack structure 100 can be of any shape and dimension. The shape of stack structure 100 can be prismatic with a polygonal base, such as a triangle, a rectangle, a square, a pentagon, a hexagon, or a nonagon, among others. The shape of the stack structure 100 can be cylindrical with a circular (e.g., as depicted), an elliptical, or an ovular base, among others.

The stack structure 100 can have at least one longitudinal side 105, at least one top side 110, and at least one bottom side 115. The longitudinal side 105 can correspond to a portion of the stack structure 100 spanning from one lateral side to another lateral side vertically (e.g., as depicted) or horizontally on the stack structure 100. The top side 110 (sometimes referred herein as a first lateral side) can correspond to a top longitudinal portion of the stack structure 100. The bottom side 115 (sometimes referred herein as a second lateral side) can correspond to a bottom longitudinal portion of the stack structure 100, and can be opposite of the top side 110. The longitudinal side 105 can extend or span between the top side 110 and the bottom side 115 of the stack structure 100. The longitudinal side 105 can be substantially perpendicular (e.g., between 80° and 100°) to the top side 110 or the bottom side 115. The stack structure 100 can have a height corresponding to a length of the longitudinal side 105 and ranging between 15 mm to 120 mm. The stack structure 100 can have a width (or diameter in cylindrical examples) corresponding to a width of the top side 110 or the bottom side 115 and ranging between 5 mm to 60 mm. The stack structure 100 can have a length corresponding to a length of the top side 110 or the bottom side 115 and ranging between [15 mm to 120 mm.

The stack structure 100 can have at least one positive electrode 120 (sometimes referred herein as a second polarity terminal). The positive electrode 120 can correspond to or include a cathode layer of the stack structure 100. The positive electrode 120 can output conventional electrical current and can receive electrons during discharging. Conversely, the positive electrode 120 can receive conventional electrical current and can output electrons during charging. The positive electrode 120 can of any shape and dimension. For example, as depicted, the positive electrode 120 can be a thin sheet spanning at least partially between the top side 110 and the bottom side 115. The positive electrode 120 can have a height corresponding to the height of the stack layer 100. The positive electrode 120 can have a length ranging between 0.5 m to 4 m. The positive electrode 120 can have a height ranging between 15 mm to 120 mm. The positive electrode 120 can have a thickness ranging between 3 μm to 150 μm. The positive electrode 120 can be comprised of a material to undergo reduction during discharging. For example, for a lithium-ion battery cell, the positive electrode 120 can be comprised of lithium cobalt oxide ($LiCoO_2$), lithium iron phosphate ($LiFePO_4$), lithium manganese Oxide ($LiMn_2O_4$), among others.

The stack structure 100 can have at least one negative electrode 125 (sometimes referred herein as a first polarity layer). The negative electrode 125 can correspond to or include an anode layer of the stack structure 100. The negative electrode 125 can receive conventional electrical current and can output electrons during discharging. Conversely, the negative electrode 125 can output conventional electrical current and can receive electrons during charging. The negative electrode 125 can of any shape and dimension. For example, as depicted, the negative electrode 125 can be a thin sheet spanning at least partially between the top side 110 and the bottom side 115. The negative electrode 125 can have a height corresponding to the height of the stack layer 100. The negative electrode 125 can have a length ranging between 0.5 m to 4 m. The negative electrode 125 can have a height ranging between 15 mm to 120 mm. The negative electrode 125 can have a thickness ranging between 3 μm to 150 μm. The negative electrode 125 can be comprised of a material to undergo oxidation during discharging. For example, for a lithium-ion battery cell, the negative electrode 125 can be comprised of graphite and lithium titanate ($Li_4Ti_5O_{12}$), among others.

The stack structure 100 can have at least one separator 130 (sometimes referred herein as a separator layer). The separator 130 can correspond to or include an electrolyte layer of the stack structure 100. The separator 130 can separate the positive electrode 120 and the negative electrode 125. The positive electrode 120 can be arranged or situated in the stack structure 100 on one side of the separator 130. The negative electrode 125 can be arranged or situated in the stack structure 100 on the other side of the separator 130 opposite of the positive electrode 120. The separator 130 can transfer ions (e.g., cations and anions) between the positive electrode 120 and the negative electrode 125 during charging and discharging. The separator 130 can be of any shape and dimension. For example, as depicted, the separator 130 can be a thin sheet spanning at least partially between the top side 110 and the bottom side 115. The separator 130 can have a height corresponding to the height of the stack layer 100. The separator 130 can have a length ranging between 0.5 m to 4 m. The separator 130 can have a height ranging between 15 mm to 120 mm. The separator 130 can have a thickness ranging between 3 μm to 150 μm. The separator 130 can be comprised of any material to transfer ions between the positive electrode 120 and the negative electrode 125. For example, for a lithium-ion battery cell, the separator 130 can include a liquid electrolyte material (e.g., lithium tetrafluoroborate ($LiBF_4$), lithium hexafluorophosphate ($LiPF_6$), and lithium perchlorate ($LiClO_4$)) dissolved in an organic solvent (e.g., dimethyl carbonate (DMC), ethylene carbonate (EC), and diethyl carbonate (DEC)).

The stack structure 100 can have at least one positive tab 135. The positive tab 135 can function as a positive terminal for the stack structure 100, through which electrical convention current can enter during discharging and can depart during charging. The positive tab 135 can be electrically coupled with the positive electrode 120. The positive tab 135 can be welded, bonded, attached, or otherwise mechanically connected to at least a portion of the positive electrode 120. The positive tab 135 can be situated anywhere in or on the stack layer 100. The positive tab 135 can be situated along the longitudinal side 105, along the top side 110 (e.g., as depicted), or along the bottom side 115. At least a portion of the positive tab 135 can protrude from the positive electrode 120. The positive tab 135 can be comprised of an electrically conductive material, such as nickel, copper, aluminum alloy, silver, graphite, carbon fiber, among others.

The stack structure 100 can have at least one negative tab 140. The negative tab 140 can function as a positive terminal for the stack structure 100, through which electrical convention current can leave during discharging and can enter during charging. The negative tab 140 can be electrically coupled with the negative electrode 125. The negative tab 140 can be welded, bonded, attached, or otherwise mechanically connected to at least a portion of the negative electrode 125. The negative tab 140 can be situated anywhere in or on the stack layer 100. The negative tab 140 can be situated along the longitudinal side 105, along the top side 110 (e.g., as depicted), or along the bottom side 115. The negative tab 140 can be located on a different side from the positive tab 135. For example, the negative tab 140 can be located along the longitudinal side 105 or the bottom side 115, while the positive tab 135 can be situated along the top side 110. At least a portion of the negative tab 140 can protrude from the negative electrode 125. The negative tab 140 can be comprised of an electrically conductive material, such as nickel, copper, aluminum alloy, silver, graphite, carbon fiber, among others.

The stack structure 100 can have at least one support body 145. The support body 145 can be positioned or situated in a space defined by the positive electrode 120, the negative electrode 125, or the separator 130. For example, as depicted, the support body 145 can reside generally along a lateral midline through the stack structure 100. The support body 145 can be any structure or member to wrap or package the positive electrode 120, the negative electrode 125, or the separator 130 in an interleaved formation. The support body 145 can be electrically isolated from the positive electrode 120 or the negative electrode 125, and can function neither as the positive terminal nor the negative terminal for the stack structure 100. The stack structure 100 can also lack or not include the support body 145.

Within the stack structure 100, the positive electrode 120, the negative electrode 125, and the separator 130 can be wrapped, enfolded, bound, adhered, or otherwise packaged to define or form the longitudinal side 105, top side 110, and the bottom side 115. A set of positive electrodes 120, a set of negative electrodes 125, and a set of separators 130 can be arranged in succession, stack or interleaved. The set of positive electrodes 120, the set of negative electrodes 125, and the set of separators 130 can be wrapped, rolled, or spun at least partially about the support body 145. At least one of the separators 130 can separate one of the positive electrodes 120 and one of the negative electrodes 125. At least one of the positive electrodes 120 and at least one of the negative electrodes 125 can be separated without one of the separators 130 between the positive electrode 120 and the negative electrode 125. At least one of the positive electrodes 120 and at least one of the negative electrodes 125 can be adjacent with each other. The set of positive electrodes 120 and the set of negative electrodes 125 can be electrically coupled with one another in succession. Each positive electrode 120 can be electrically coupled with one of the negative electrodes 125. Each negative electrode 125 can be electrically coupled with one of the positive electrodes 120. Each positive electrode 120, each negative electrode 125, each separator 130 can be arranged longitudinally in the stack structure 100 (e.g., as depicted). Each positive electrode 120, each negative electrode 125, each separator 130 can be arranged laterally in the stack structure 100.

The stack structure 100 can lack an individual casing, housing, or container. The stack structure 100 can correspond to the collection of the positive electrode 120, the negative electrode 125, the separator 130, the positive tab 135, the negative tab 140, and the support body 145, without an individual outer casing, housing, or container dedicated to the stack structure 100. The individual casing can correspond or encompass the shape or dimensions of the stack structure 100, without space for multiple stack structures 100. With the individual casing, the stack structure 100 can be lighter in weight than a battery cell with the stack structure and the casing. For example, the battery cell with the both the stack structure and casing can have a weight ranging between 15 g to 150 g, whereas the stack structure 100 itself can have a weight between 5 g to 150 g. In addition, relative to such battery cells, the stack structure 100 (including the positive electrode 120, the negative electrode 125, and the separator 130) can be made larger, thereby increasing the output voltage and capacity. For example, the battery cell with the both the stack structure and casing can have an output voltage ranging between 1V to 7V, whereas the stack structure 100 itself can have an output voltage between 1V to 7V.

Figure 2:
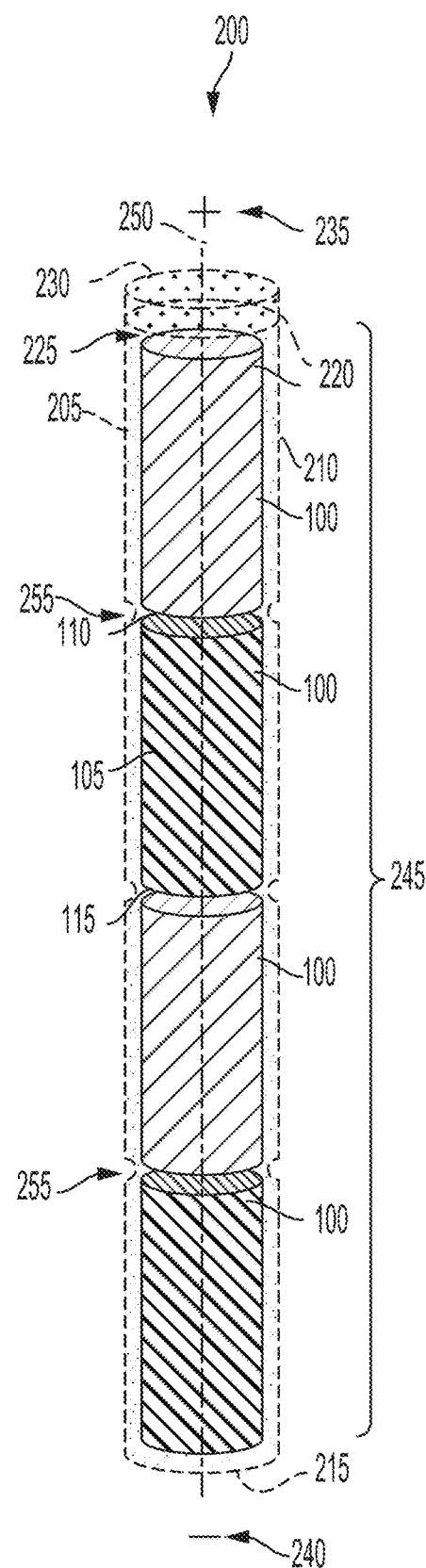
FIG. 2 depicts an oblique perspective view of an example battery cell array assembly for powering an electric vehicle.

FIG. 2, among others, depicts an oblique perspective view of an apparatus or a cell array assembly 200 for powering an electric vehicle. The cell array assembly 200 can have a single housing 205. The housing 205 can hold or contain multiple stack structures 100 to store and provide electrical power. The housing 205 can be of any shape and dimension. The shape of the housing 205 can be prismatic with a polygonal base, such as a triangle, a rectangle, a square, a pentagon, a hexagon, or a nonagon, among others. The shape of the housing 205 can be cylindrical with a circular (e.g., as depicted), an elliptical, or an ovular base, among others. The housing 205 can have a width (or a diameter in cylindrical examples as depicted) ranging between 5 mm to 60 mm. The housing 205 can have a length ranging between 15 mm to 1500 mm. The housing 205 can have a height ranging between 15 mm to 1500 mm. The housing 205 itself can have a weight ranging between 15 g to 2 kg.

The housing 205 can be comprised of one or more electrically conductive, electrically insulative, and thermally conductive materials, or any combination thereof. The electrically conductive and thermally conductive material for the housing 205 can include a metallic material, such as an aluminum alloy with copper, silicon, tin, magnesium, manganese or zinc (e.g., of the aluminum 1000, 4000, or 5000 series), iron, iron-carbon alloy (e.g., steel), silver, nickel, and copper, or any combination thereof, among others. The electrically insulative and thermally conductive material for the housing 205 can include a ceramic material (e.g., silicon nitride, titanium carbide, zirconium dioxide, beryllium oxide, and among others) and a thermoplastic material (e.g., polyethylene, polypropylene, polystyrene, polyvinyl chloride, or nylon), among others.

The housing 205 can have at least one sidewall 210 (e.g., a longitudinal surface, side, wall, or covering). The sidewall 210 can form an integral portion of the housing 205. The sidewall 210 can correspond to a longitudinal side of the housing 205. The sidewall 210 can extend or span between one lateral side and the opposite lateral side of the housing 205. The sidewall 210 can cover or shield a longitudinal portion of the contents within the housing 205, such as the multiple stack structures 100. The sidewall 210 can be comprised of one or more electrically conductive, electrically insulative, and thermally conductive materials, or any combination thereof. The sidewall 210 can be comprised of an electrically conductive and thermally conductive material, such as an aluminum alloy, iron, iron-carbon alloy, nickel, copper, or any combination thereof. The sidewall 210 can be comprised of an electrically insulative and thermally conductive material, such as a ceramic or a thermoplastic. The sidewall 210 can be of any dimensions. The sidewall 210 can be substantially perpendicular (e.g., between 80° and 100°) to one lateral side of the housing 205. The sidewall 210 can have a height corresponding to the height of the housing 205 and ranging between 15 mm to 1500 mm. The sidewall 210 can have a perimeter (or circumference in cylindrical examples) ranging between 5 mm to 500 mm. The sidewall 210 can have a thickness ranging between 1 µm to 100 µm. The sidewall 210 itself can have a weight ranging between 250 mg to 1.5 kg.

The housing 205 can have at least one cover element 215 (e.g., a floor or a bottom cover). The cover element 215 can correspond to one lateral end of the housing 205, such as a top side, a bottom side (e.g., as depicted), a left side, or a right side. The cover element 215 can at least partially span the lateral end of the housing 205. The cover element 215 can form an integral portion of the housing 205. The cover element 215 can also be a separate from the housing 205, and then added to the corresponding lateral side of the housing 205 on the sidewall 210. The cover element 215 can cover or shield a lateral portion of the contents within the housing 205, such as the multiple stack structures 100. The cover element 215 can also support the contents within the housing 205 along the lateral portion of the contents (e.g., multiple stack structures 100). The cover element 215 can be comprised of one or more electrically conductive, electrically insulative, and thermally conductive materials, or any combination thereof. The cover element 215 can be comprised of an electrically conductive and thermally conductive material, such as an aluminum alloy, iron, iron-carbon alloy, nickel, copper, or any combination thereof. The cover element 215 can be comprised of an electrically insulative and thermally conductive material, such as a ceramic or a thermoplastic. The cover element 215 can form or correspond to the base of the housing 205. The cover element 215 can have a length ranging between 1 mm to 150 mm. The cover element 215 can have a width (or diameter in circular examples) ranging between 1 mm to 150 mm. The cover element 215 can have a thickness ranging between 1 µm to 150 µm. The cover element 215 itself can have a weight ranging between 1 mg to 100 g.

The housing 205 can define or have at least one opening 220. The opening 220 can correspond to an aperture, hole, or space defined along one lateral end of the housing 205, such as a top side (e.g., as depicted), a bottom side, a left side, or a right side. The opening 220 can at least partially span the lateral end of the housing 205. The opening 220 can be defined on the end of the housing 205 opposite of the cover element 215. The opening 220 can be defined by the sidewall 210 of the housing 205. The opening 220 can be of any shape and dimension. The opening 220 can be of the same or similar dimensions (e.g., within 10%) as the cover element 215 on the other end of the housing 205. The opening 220 can have a length ranging between 1 µm to 500 µm. The opening 220 can have a width (or diameter in circular examples) ranging between 1 µm to 500 µm.

The housing 205 can define or have at least one cavity 225. Contents of the housing 205 (e.g., the multiple stack structures 100) can be stored within the cavity 225. The cavity 225 can correspond to an empty hollowing, space, region, or volume within the housing 205. The cavity 225 can be longitudinally defined by the sidewall 210. The cavity 225 can laterally span within the sidewall 210. The cavity 225 can be laterally defined by the cover element 215. The cavity 225 can longitudinally span from the cover element 215 on one end of the housing 205 to the opening 220 on the other end of the housing 205. One lateral end of the cavity 225 can correspond to the cover element 215 on the lateral end of the housing 205 (e.g., on the bottom as depicted). One lateral end of the cavity 225 can correspond to the opening 220 defined along the lateral end of the housing 205 (e.g., on the top as depicted).

The cell array assembly 200 can have at least one capping element 230. The capping element 230 can cover, secure, and hold the contents (e.g., multiple stack structures 100) of the housing 205 therein. The capping element 230 can be mechanically coupled (e.g., fastened, attached, welded, bonded, or glued, brazed) to the housing 205. The capping element 230 can be mechanically coupled to one lateral end of the housing 205 corresponding to the opening 220. The capping element 230 can be situated on the opposite lateral end as the cover element 215. The capping element 230 can be of any shape and dimension. The capping element 230 can include can include a current interrupter device (CID), over-current protector, or a thermal vent, among other mechanisms, to maintain the integrity of the housing 205 and the contents therein. The capping element 230 can be the same shape as the cover element 215 and can have substantially similar dimensions (e.g., within 15%) as the cover element 215. The cover element 215 can form or correspond to the base of the housing 205 on the opening 220. The capping element 230 can have a length ranging between 30 µm to 150 mm. The capping element 230 can have a width (or diameter in circular examples) ranging between 10 µm to 150 mm. The capping element 230 can have a thickness ranging between 1 µm to 150 mm. The capping element 230 itself can have a weight ranging between 50 µg to 500 g.

The cell array assembly 200 can have at least one positive terminal 235 (referred herein generally as a second polarity terminal) and at least one negative terminal 240 (generally referred herein generally as a first polarity terminal). The negative terminal 240 can be of the opposite polarity as the positive terminal 235. Both the positive terminal 235 and the negative terminal 240 can be electrically coupled to other components to provide electrical power to the components. At least a portion of the capping element 230 can have, define, or correspond to the positive terminal 235 (e.g., as depicted). For example, an exposed metallic portion of the capping element 230 can define the positive terminal 235 for the cell array assembly 200. In addition, at least a portion of the housing 205 (e.g., the sidewall 210 and the cover element 215) can have, define, or correspond to the negative terminal 240 (e.g., as depicted). For example, the sidewall 210 or the cover element 215, or both components, of the housing 205 can define the negative terminal 240 for the cell array assembly 200. Conversely, at least a portion of the capping element 230 can have, define, or correspond to the negative terminal 240. At least a portion of the housing 205 (e.g., the sidewall 210 and the cover element 215) can have, define, or correspond to the positive terminal 235 (e.g., as depicted).

The cell array assembly 200 can have at least one battery cell array 245. The battery cell array 245 can store electrical energy to power components electrically coupled with the cell array assembly 200. The battery cell array 245 can include the multiple stack structures 100. The battery cell array 245 can have any number of stack structures 100. For example, the depicted battery cell array 245 can have four stack structures 100. The stack structures 100 of the battery cell array 245 can be electrically coupled together in series or in parallel, or in combination of series and parallel. By electrically coupling the positive electrodes 120 and the negative electrodes 125 of the stack structures 100 in a specified manner, the battery cell array 245 can have a parallel or a series configuration. For a parallel connection, the positive electrodes 120 of all the stack structures 100 in the battery cell array 245 can be electrically coupled to the positive terminal 235 and the negative electrodes 125 of all the stack structures 100 can be electrically coupled to the negative terminal 240. For a series connection, the positive electrode 120 of each stack structure 100 can be electrically coupled with the negative electrode 125 of another stack structure 100. Furthermore, the positive electrode 120 of at least one stack structure 100 can be electrically coupled with the positive terminal 235 and the negative electrode 125 of another stack structure 100 can be electrically coupled with the negative terminal 240. For a parallel-series combination connection, a subset of the stack structures 100 can be electrically coupled together in parallel and another subset of the stack structures 100 can be electrically coupled together in series. In addition, the subsets of stack structures 100 can be electrically coupled together in series or parallel.

The battery cell array 245 can be situated, disposed, or otherwise arranged in the cavity 225 of the housing 205. Each stack structure 100 of the battery cell array 245 can be disposed or arranged within the cavity 225 of the housing 205. The stack structures 100 of the battery cell array 245 can be arranged in succession or in series within the cavity 225 of the housing 205. For example, the top side 110 of a second stack structure 100 can be situated below the bottom side 115 of a first stack structure 100 in the battery cell array 245. The bottom side 115 of the second stack structure 100 in turn can be situated above the top side 110 of a third stack structure 100. The top side 110 of one stack structure 100 can at least partially face the bottom side 115 of another stack structure 100. The bottom side 115 of one stack structure 100 can at least partially face the top side 110 of another stack structure 100.

The stack structures 100 of the battery cell array 245 can be substantially aligned (e.g., within 15% deviation) about an axis 250. The axis 250 can be defined along a longitudinal orientation (e.g., lengthwise) through the battery cell array 245 arranged within the housing 205. For example, as depicted, the axis 250 can run along the length of the housing 205 from the left side toward the right side. The axis 250 can be substantially perpendicular (e.g., between 80° and 100°) to the cover element 215. The axis 250 can be substantially perpendicular (e.g., between 80° and 100°) to the capping element 230. Each stack structure 100 in the battery cell array 245 can be aligned with one another about the axis 250. The axis 250 can be substantially perpendicular (e.g., between 80° and 100°) to the top side 110 of each stack structure 100. The axis 250 can be substantially perpendicular (e.g., between 80° and 100°) to the bottom side 115 of each stack structure 100.

The housing 205 can have at least one indentation 255 (e.g., a beading or perforation). Each indentation 255 can be defined at least partially along the sidewall 210 of the housing 205. For example, as depicted, each indentation 255 can laterally span the sidewall 210 of the housing 205. Each indentation 255 can be substantially perpendicular (e.g., between 80° and 100°) to the axis 250 defined through the housing 205 and the battery cell array 245. The width (or diameter in cylindrical examples) of the housing 205 along the indentation 255 can be less than the width (or diameter in cylindrical examples) of the housing 205 in other portions. The indentation 255 can be of any shape or dimension. The indentation 255 can be a prismatic impression into the outer surface of the sidewall 210 with a polygonal base, such as a triangle, a square, a rectangle (e.g., as depicted), a pentagon, and a hexagon, among others. The indentation 255 can be a half-cylindrical impression into the outer surface of the sidewall 210 with a circular, elliptical, or ovular base, among others. The indentation 255 can have a perimeter (or circumference when the housing 205 is cylindrical) ranging between 5 mm to 500 mm. The indentation 255 can have a width ranging between 1 mm to 500 mm. The indentation 255 can have a depth ranging between 1 μm to 5 mm.

At least one of the indentations 255 can be situated between two of the stack structures 100 to physically separate one stack structure 100 from another stack structure 100 of the battery cell array 245 arranged in the cavity 225 of the housing 205. An inner surface of the sidewall 210 about the indentation 255 can separate one stack structure 100 from the directly adjacent stack structure 100 (e.g., to the immediate bottom or top) in the battery cell array 245. The separation of the stack structures 100 by the inner surface of the sidewall 210 about the indentation 255 can also prevent direct electrical coupling between the directly adjacent stack structures 100. The inner surface of the sidewall 210 about the indentation 255 can separate one stack structure 100 from the directly adjacent stack structure 100. The inner surface of the sidewall 210 about the indentation 255 can also support at least one stack structure 100 along the bottom surface 115. The inner surface of the sidewall 210 about the indentation 255 can be in contact with at least a portion of the bottom surface 115 of one stack structure 100 of the battery cell array 245. A separation distance formed by the indentation 255 between the bottom surface 115 of one stack structure and the top surface 100 of another stack structure directly below can range between 1 μm to 150 mm.

Figure 3:
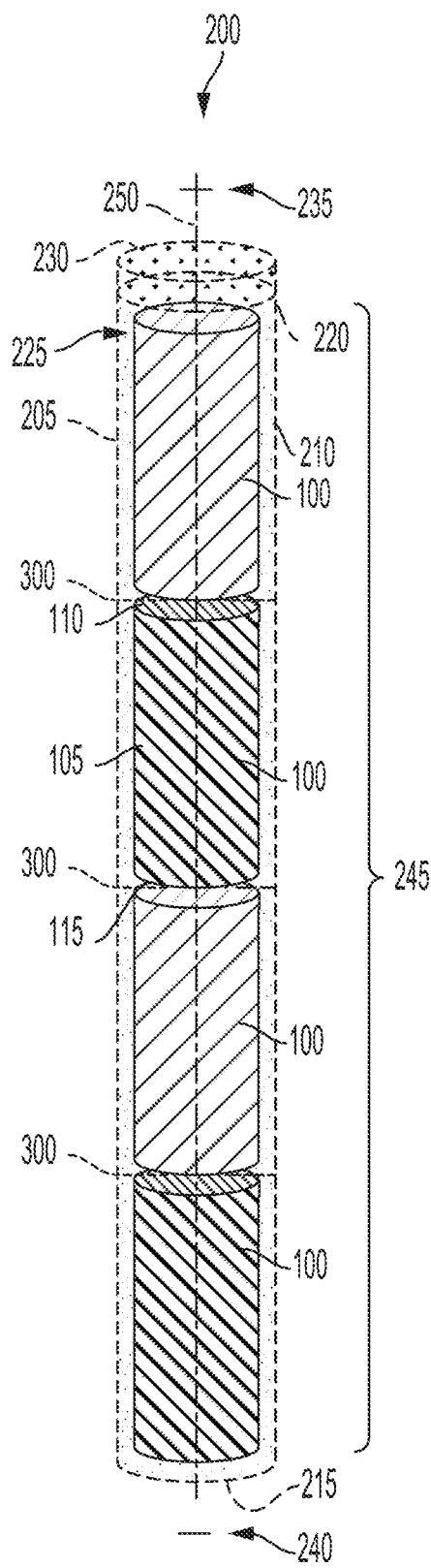
FIG. 3 depicts an oblique perspective view of an example battery cell array assembly for powering an electric vehicle.

FIG. 3, among others, depicts an oblique perspective view of the cell array assembly 200 for powering an electric vehicle. The cell array assembly 200 can have at least one inner support element 300 (e.g., a fixed support element). Each inner support element 300 can be arranged along an inner side of the sidewall 210 of the housing 205. For example, as depicted, each inner support element 300 can laterally span the inner side of the sidewall 210 of the housing 205. Each inner support element 300 can be mechanically coupled (e.g., affixed, attached, welded, fastened, or brazed) to the inners side of the sidewall 210 of the housing 205. Each inner support element 300 can be substantially perpendicular (e.g., between 80° and 100°) to the axis 250 defined through the housing 205 and the battery cell array 245.

The inner support element 300 can be of any shape or dimension. The inner support element 300 can define or having an opening to pass the contents of the housing 205. The opening of the inner support element 300 can be defined through a lateral side of the inner support element 300. The width (or diameter in cylindrical examples) of the cavity 225 in the housing 205 along the opening of the inner support element 300 can be less than the width (or diameter in cylindrical examples) of the cavity 225 in other portions. The inner support element 300 can be a prism into the outer surface of the sidewall 210 with a polygonal base, such as a triangle, a square, a rectangle, a pentagon, and a hexagon, among others. The opening of the inner support element 300 can be prismatic, with a polygonal base, such as a triangle, a square, a rectangle, a pentagon, and a hexagon, among others. The inner support element 300 can be a cylinder with a circular, elliptical, or ovular base, among others. The opening of the inner support element 300 can be cylindrical with a circular, elliptical, or ovular base, among others. For example, the inner support element 300 can be in the shape of concentric circles. The inner support element 300 can have a length ranging between 1 μm to 150 mm. The inner support element 300 can have a width (or diameter in cylindrical examples) ranging between 1 μm to 150 mm. The opening of the inner support element 300 can have a width (or diameter in cylindrical examples) ranging between 1 μm to 150 mm. The inner support element 300 can have a thickness ranging between 1 μm to 50 mm.

At least one of the inner support elements 300 can be situated between two of the stack structures 100 to physically separate one stack structure 100 from another stack structure 100 of the battery cell array 245 arranged in the cavity 225 of the housing 205. The inner support element 300 itself can separate one stack structure 100 from the directly adjacent stack structure 100 (e.g., to the immediate bottom or top) in the battery cell array 245. The separation of the stack structures 100 by the inner support element 300 can also prevent direct electrical coupling between the directly adjacent stack structures 100. A pair of the inner support elements 300 can secure at least one stack structure 100 of the battery cell array 245 in the cavity 225 of the housing 205 along the top surface 110 and the bottom surface 115 of the stack structure 100. The inner support element 300 can hold at least one least stack structure along the top surface 110 of the stack structure 100. The inner support element 300 can also support at least one stack structure 100 along the bottom surface 115 of the stack structure 100. The inner support element 300 can be in contact with at least a portion of the bottom surface 115 of one stack structure 100 of the battery cell array 245. A separation distance formed by the inner support element 300 between the bottom surface 115 of one stack structure and the top surface 100 of another stack structure directly below can range between 1 μm to 100 mm.

Figure 4:
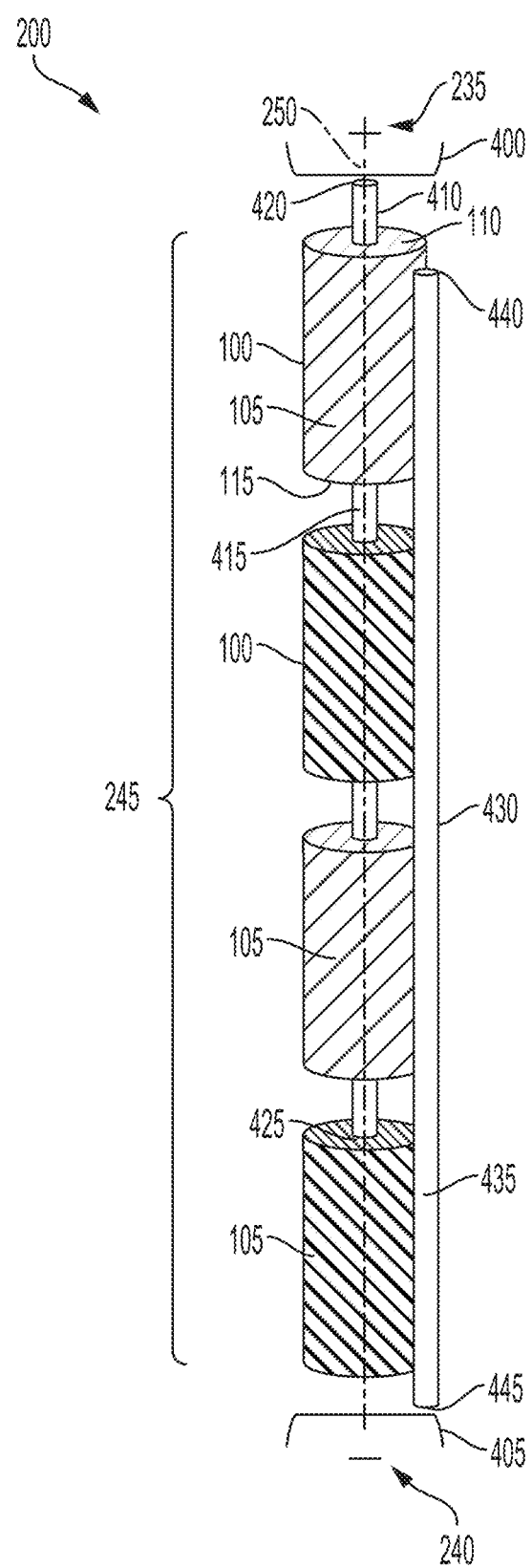
FIG. 4 depicts an oblique perspective view of an example battery cell array electrically coupled in parallel.

FIG. 4, among others, depicts an oblique perspective view of the battery cell array 245 electrically coupled in parallel. As depicted, the battery cell array 245 of the cell array assembly 200 can have a parallel configuration, with the multiple stack structures 100 electrically coupled together in parallel. The battery cell array 245 can have at least one positive terminal 400 (generally referred herein as a first polarity terminal). The positive terminal 400 of the battery cell array 245 can be electrically coupled with the positive terminal 235 of the cell array assembly 200. The positive terminal 400 of the battery cell array 245 can be electrically coupled with the positive terminal 235 on the capping element 230. The positive terminal 400 of the battery cell array 245 can be connected (e.g., fastened, attached, welded, brazened, or in contact) with at least a portion of the capping element 230 (e.g., along the bottom lateral surface). The positive terminal 400 of the battery cell array 245 can correspond to the positive electrode 120 or the positive tab 135 of at least one of the stack structures 100 in the battery cell array 245. The positive terminal 400 of the battery cell array 245 can be a contact (e.g., as depicted) electrically coupled with the positive electrode 120 or the positive tab 135 of at least one of the stack structures 100 and the positive terminal 235. The contact can be comprised of an electrically conductive material, such as a metal or graphite fiber, to electrically couple the positive electrode 120 or the positive tab 135 of at least one of the stack structures 100 with the capping element 230.

The battery cell array 245 can have at least one negative terminal 405 (generally herein referred as a second polarity terminal). The negative terminal 405 of the battery cell array 245 can be electrically coupled to the negative terminal 240 of the cell array assembly 200. The negative terminal 405 of the battery cell array 245 can be electrically coupled with the negative terminal 240 on the housing 205 or the cover element 230. The negative terminal 405 of the battery cell array 245 can be connected (e.g., fastened, attached, welded, brazened, or in contact) with at least a portion of the housing 205 (e.g., along the inner side of the cavity 225). The negative terminal 405 of the battery cell array 245 can be connected (e.g., fastened, attached, welded, brazened, or in contact) with at least a portion of the cover element 230 (e.g., along the top lateral surface). The negative terminal 405 of the battery cell array 245 can correspond to the negative electrode 125 or the negative tab 140 of at least one of the stack structures 100 in the battery cell array 245. The negative terminal 405 of the battery cell array 245 can be a contact (e.g., as depicted) electrically coupled with the negative electrode 125 or the negative tab 140 of at least one of the stack structures 100 and the negative terminal 240. The contact can be comprised of an electrically conductive material, such as a metal or graphite fiber, to electrically couple the negative electrode 125 or the negative tab 140 of at least one of the stack structures 100 with the housing 205 or the cover element 215.

The cell array assembly 200 can have at least one positive bonding element 410 (e.g., a bonding element or a second bonding element). The positive bonding element 410 can be part of the battery cell array 245. The positive bonding element 410 can be disposed or arranged within the cavity 225 defined in the housing 205. The positive bonding element 410 can be electrically coupled with the positive terminal (e.g., the positive electrode 120 or the positive tab 135) of each stack structure 100 in the battery cell array 245. The positive bonding element 410 can be also electrically coupled with the positive terminal 400 of the battery cell array 245. The positive bonding element 410 can be also electrically coupled with the positive terminal 235 of the cell array assembly 200. The positive bonding element 410 can be comprised of an electrically conductive material. The electrically conductive material for the positive bonding element 410 can include a metallic material (e.g., nickel, copper, silver, or aluminum alloy) or a carbon-based material (e.g., graphite or carbon fiber). The positive bonding element 410 can be of any shape or dimension. For example, the positive bonding element 410 can be shaped as a thin wire. The positive bonding element 410 can have a length ranging between 5 mm to 150 mm. The positive bonding element 410 can have a width (or diameter in cylindrical examples) ranging between 0.5 mm to 30 mm. The positive bonding element 410 can have a height ranging between 5 mm to 150 mm.

The positive bonding element 410 can have at least one body 415. The body 415 can correspond to a longitudinal portion of the positive bonding element 410. At least a portion of the body 415 of the positive bonding element 410 can be substantially aligned or parallel (e.g., between 80° and 100°) with the axis 250 defined through the housing 205. The body 415 can at least partially span or extend the cavity 225 of the housing 205. The body 415 can at least partially span or extend the battery cell array 245 (e.g., through the length of the battery cell array 245 as depicted). The body 415 can be mechanically coupled (e.g., fastened, attached, welded, brazed, soldered, or in contact) with the positive terminal (e.g., the positive electrode 120 or the positive tab 135) of at least one of the stack structures 100. The positive terminal of the stack structure 100 can be on a lateral portion (e.g., top side 110 or the bottom side 115) or in an interior portion of the stack structure 100 (e.g., as depicted). The body 415 can pass through the at least one of the stack structures 100 of the battery cell array 245 to electrically couple with the positive terminal of the stack structure 100. For example, as depicted, the body 415 can pass through the midline of the stack structures 100 of the battery cell array 245. The positive terminal of the stack structure 100 can be on a lateral portion (e.g., longitudinal side 105) in an exterior portion of the stack structure 100. The body 415 can also be flush or in contact with the outer surface of at least one of the stack structures 100 to electrically couple with the positive terminal of the stack structure 100.

The positive bonding element 410 can have at least one end 420 (e.g., a second end). The end 420 can correspond to a lateral end of the positive bonding element 410 (e.g., along the top end as depicted). The end 420 can be situated or positioned in the cavity 225 adjacent to the capping element 230. The end 420 can be electrically coupled to the positive terminal 400 of the battery cell array 245. The end 420 of the positive bonding element 410 can be mechanically coupled (e.g., fastened, welded, brazed, soldered, to in contact) the contact corresponding to the positive terminal 400 for the battery cell array 245. The end 420 can be electrically coupled to the positive terminal 235 on the capping element 230 of the cell array assembly 200. The end 420 can be mechanically coupled (e.g., fastened, welded, brazed, soldered, to in contact) to at least a portion of the capping element 230. Through the end 420, the positive terminal 235 of the cell array assembly 200 an be electrically coupled with the positive terminal of each stack structure 100 of the battery cell array 245.

The positive bonding element 410 can have at least one end 425 (e.g., a first end). The end 425 can correspond to a lateral end of the positive bonding element 410 opposite of the other end 420 (e.g., along the bottom end as depicted). The end 425 can be mechanically coupled with the top side 110 of at least one of the stack structures 100 (e.g., as depicted). The end 425 can be mechanically coupled with the bottom side 115 of at least one of the stack structures 100. The end 425 can also be within at least one of the stack structures 100 between the top side 110 and the bottom side 115. The end 425 can also be within along the longitudinal surface 105 at least one of the stack structures 100 (e.g., as depicted). The end 425 can be electrically coupled with the positive terminal (e.g., the positive electrode 120 or the positive tab 135) at least one of the stack structures 100. The end 425 of the positive bonding element 410 can be mechanically coupled (e.g., fastened, welded, brazed, soldered, to in contact) at least one of the stack structures 100 to form the electrical coupling. The end 425 can lack any mechanical or electrical connection with the negative terminal 405 of the battery cell array 245.

The cell array assembly 200 can have at least one negative bonding element 430 (e.g., a bonding element or a first bonding element). The negative bonding element 430 can be part of the battery cell array 245. The negative bonding element 430 can be disposed or arranged within the cavity 225 defined in the housing 205. The negative bonding element 430 can be electrically coupled with the negative terminal (e.g., the negative electrode 125 or the negative tab 140) of each stack structure 100 in the battery cell array 245. The negative bonding element 430 can be also electrically coupled with the negative terminal 405 of the battery cell array 245. The negative bonding element 430 can be also electrically coupled with the negative terminal 240 of the cell array assembly 200. The negative bonding element 430 can be comprised of an electrically conductive material. The electrically conductive material for the negative bonding element 430 can include a metallic material (e.g., nickel, copper, silver, or aluminum alloy) or a carbon-based material (e.g., graphite or carbon fiber). The negative bonding element 430 can be of any shape or dimension. For example, the negative bonding element 430 can be shaped as a thin wire. The negative bonding element 430 can have a length ranging between 5 mm to 150 mm. The negative bonding element 430 can have a width (or diameter in cylindrical examples) ranging between 0.5 mm to 30 mm. The negative bonding element 430 can have a height ranging between 5 mm to 150 mm.

The negative bonding element 430 can have at least one body 435. The body 435 can correspond to a longitudinal portion of the negative bonding element 430. At least a portion of the body 435 of the negative bonding element 430 can be substantially aligned or parallel (e.g., between 80° and 100°) with the axis 250 defined through the housing 205. The body 435 can at least partially span or extend the cavity 225 of the housing 205. The body 435 can at least partially span or extend the battery cell array 245 (e.g., through the length of the battery cell array 245 as depicted). The body 435 can be mechanically coupled (e.g., fastened, attached, welded, brazed, soldered, or in contact) with the negative terminal (e.g., the negative electrode 125 or the negative tab 140) of at least one of the stack structures 100. The negative terminal of the stack structure 100 can be on a lateral portion (e.g., top side 110 or the bottom side 115) or in an interior portion of the stack structure 100. The body 435 can pass through the at least one of the stack structures 100 of the battery cell array 245 to electrically couple with the negative terminal of the stack structure 100. For example, the body 435 can pass through the midline of the stack structures 100 of the battery cell array 245 to couple with the negative terminal. The negative terminal of the stack structure 100 can be on a lateral portion (e.g., longitudinal side 105) or an exterior portion of the stack structure 100 (e.g., as depicted). The body 435 can also be flush or in contact with the outer surface of at least one of the stack structures 100 to electrically couple with the negative terminal of the stack structure 100.

The negative bonding element 430 can have at least one end 440. (e.g., a first end). The end 440 can correspond to a lateral end of the negative bonding element 430 (e.g., along the bottom end as depicted). The end 440 can be mechanically coupled with the top side 110 of at least one of the stack structures 100. The end 440 can be mechanically coupled with the bottom side 115 of at least one of the stack structures 100. The end 440 can also be within at least one of the stack structures 100 between the top side 110 and the bottom side 115. The end 440 can also be within along the longitudinal surface 105 at least one of the stack structures 100 (e.g., as depicted). The end 440 can be electrically coupled with the negative terminal (e.g., the negative electrode 125 or the negative tab 140) at least one of the stack structures 100. The end 440 of the negative bonding element 430 can be mechanically coupled (e.g., fastened, welded, brazed, soldered, to in contact) at least one of the stack structures 100 to form the electrical coupling. The end 440 can lack any mechanical or electrical connection with the positive terminal 400 of the battery cell array 245.

The negative bonding element 430 can have at least one end 445 (e.g., a second end). The end 445 can correspond to a lateral end of the negative bonding element 430 (e.g., along the top end as depicted). The end 445 can be situated or positioned in the cavity 225 adjacent to the covering element 215 of the housing 205. The end 445 can be electrically coupled to the positive terminal 400 of the battery cell array 245. The end 445 of the negative bonding element 430 can be mechanically coupled (e.g., fastened, welded, brazed, soldered, to in contact) the contact corresponding to the negative terminal 405 for the battery cell array 245. The end 445 can be electrically coupled to the negative terminal 240 on the housing 205 of the cell array assembly 200. The end 445 can be mechanically coupled (e.g., fastened, welded, brazed, soldered, to in contact) to at least a portion of the housing 205. The end 445 can be electrically coupled to the negative terminal 240 on the covering element 215 of the cell array assembly 200. Through the end 445, the positive terminal 235 of the cell array assembly 200 an be electrically coupled with the negative terminal of each stack structure 100 of the battery cell array 245.

Figure 5:
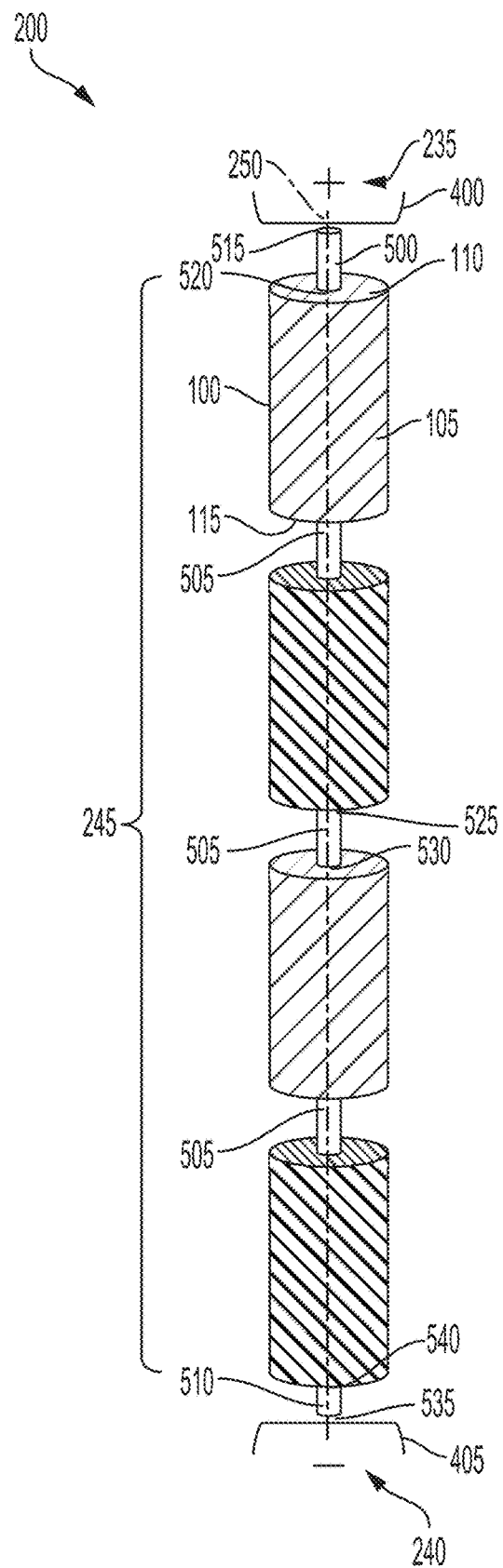
FIG. 5 depicts an oblique perspective view of an example battery cell array electrically coupled in series.

FIG. 5, among others, depicts an oblique perspective view of the battery cell array 245 electrically coupled in series. As depicted, the battery cell array 245 of the cell array assembly 200 can have a series configuration, with the multiple stack structures 100 electrically coupled together in series. The cell array assembly 200 can have a set of bonding elements 500-510 to electrically couple the stack structures 100 of the battery cell array 245 in series. The set of bonding elements 500-510 The set of bonding elements 500-510 can electrically couple the stack structures 100 of the battery cell array 245 with the positive terminal 400 and the negative terminal 405 in series. Each bonding element 500-510 can be comprised of an electrically conductive material. The electrically conductive material for the positive bonding element 410 can include a metallic material (e.g., nickel, copper, silver, or aluminum alloy) or a carbon-based material (e.g., graphite or carbon fiber). Each bonding element 500-510 can be of any shape or dimension. For example, each bonding element 500-510 can be shaped as a thin wire. Each bonding element 500-510 can have a length ranging between 0.1 mm to 30 mm. Each bonding element 500-510 can have a width (or diameter in cylindrical examples) ranging between 0.05 mm to 30 mm. Each bonding element 500-510 can have a height ranging between 0.1 mm to 30 mm.

The bonding element 500 can span or extend between one of the stack structures 100 and the positive terminal of the battery cell array 245. The bonding element 500 can have an end 515 and an end 520. Each end 515 and 520 can correspond to a lateral end of the bonding element 500. For example, as depicted, the end 515 can correspond to a top lateral end of the bonding element 500 and the end 520 can correspond to a bottom lateral end of the bonding element 500. The end 515 can be electrically coupled with the positive terminal 400 of the battery cell array 245. The end 515 can be mechanically coupled (e.g., fastened, welded, brazed, soldered, to in contact) with the contact corresponding to the positive terminal 400. The end 515 can be electrically coupled with the positive terminal 235 on the capping element 230. The end 515 can be mechanically coupled with at least a portion of the capping element 230. The end 520 can be electrically coupled with the negative terminal (e.g., the negative electrode 125 or the negative tab 140) of the stack structure 100. The end 520 can be mechanically coupled the negative terminal of the stack structure 100. The negative terminal can be defined on the longitudinal side 105, top side 110 (e.g., as depicted), the bottom side 115, or an interior portion of the stack structure 100. At least a portion of the longitudinal side 105 can have the negative terminal for the stack structure 100. At least a portion of the top side 110 can have the negative terminal for the stack structure 100. At least a portion of the bottom side 115 can have the negative terminal for the stack structure 100.

Each bonding element 505 can span or extend between a pair of stack structures 100 in the battery cell array 245. The bonding element 505 can have an end 525 and an end 530. Each end 525 and 530 can correspond to a lateral end of the bonding element 505. For example, as depicted, the end 525 can correspond to a top lateral end of the corresponding bonding element 505 and the end 530 can correspond to a bottom lateral end of the same bonding element 505. The end 525 can be electrically coupled with the terminal of one stack structure 100 (e.g., the stack structure 100 toward the top as depicted). With a positive terminal, the end 525 can be electrically coupled with the positive electrode 120 or the positive tab 135 of one stack structure 100. With a negative terminal, the end 525 can be electrically coupled with the negative electrode 125 or the negative tab 140 of the stack structure 100. The end 525 can be mechanically coupled (e.g., fastened, welded, brazed, soldered, to in contact) with the terminal of the stack structure 100. At least a portion of the longitudinal side 105 can have the terminal for the stack structure 100. At least a portion of the top side 110 can have the terminal for the stack structure 100. At least a portion of the bottom side 115 can have the terminal for the stack structure 100. The terminal on the top side 110 of the stack structure 100 can be of the opposite polarity as the terminal on the longitudinal side 105 or bottom side 115 of the stack structure 100.

In addition, the end 530 of each bonding element 505 can be electrically coupled with the opposite terminal of an adjacent stack structure 100 (e.g., the stack structure 100 towards the bottom as depicted). For example, if the end 525 is electrically coupled with the positive terminal of the stack structure 100 above, the end 530 can be electrically coupled with the negative terminal of the stack structure 100 below. With a positive terminal, the end 530 can be electrically coupled with the positive electrode 120 or the positive tab 135 of one stack structure 100. With a negative terminal, the end 530 can be electrically coupled with the negative electrode 125 or the negative tab 140 of the stack structure 100. The end 530 can be mechanically coupled (e.g., fastened, welded, brazed, soldered, to in contact) with the terminal of the stack structure 100. At least a portion of the longitudinal side 105 can have the terminal for the stack structure 100. At least a portion of the top side 110 can have the terminal for the stack structure 100. At least a portion of the bottom side 115 can have the terminal for the stack structure 100. The terminal on the top side 110 of the stack structure 100 can be of the opposite polarity as the terminal on the longitudinal side 105 or bottom side 115 of the stack structure 100.

The bonding element 510 can span or extend between one stack structures 100 and the negative terminal 405 of the battery cell array 245. The bonding element 510 can have an end 535 and an end 540. Each end 535 and 540 can correspond to a lateral end of the bonding element 510. For example, as depicted, the end 535 can correspond to a bottom lateral end of the bonding element 510 and the end 540 can correspond to a top lateral end of the bonding element 510. The end 535 can be electrically coupled with the negative terminal 405 of the battery cell array 245. The end 535 can be mechanically coupled (e.g., fastened, welded, brazed, soldered, to in contact) with the contact corresponding to the negative terminal 405. The end 535 can be electrically coupled with the negative terminal 240 on the housing 205 or the covering element 215. The end 535 can be mechanically coupled with at least a portion of the housing 205 (e.g., along an interior of the sidewall 210). The end 535 can be mechanically coupled with at least a portion of the covering element 215. The end 540 can be electrically coupled with the positive terminal (e.g., the positive electrode 120 or the positive tab 135) of the stack structure 100. The end 540 can be mechanically coupled the negative terminal of the stack structure 100. The positive terminal can be defined on the longitudinal side 105, top side 110 (e.g., as depicted), the bottom side 115, or an interior portion of the stack structure 100. At least a portion of the longitudinal side 105 can have the terminal for the stack structure 100. At least a portion of the top side 110 can have the terminal for the stack structure 100. At least a portion of the bottom side 115 can have the terminal for the stack structure 100.

Figure 6:
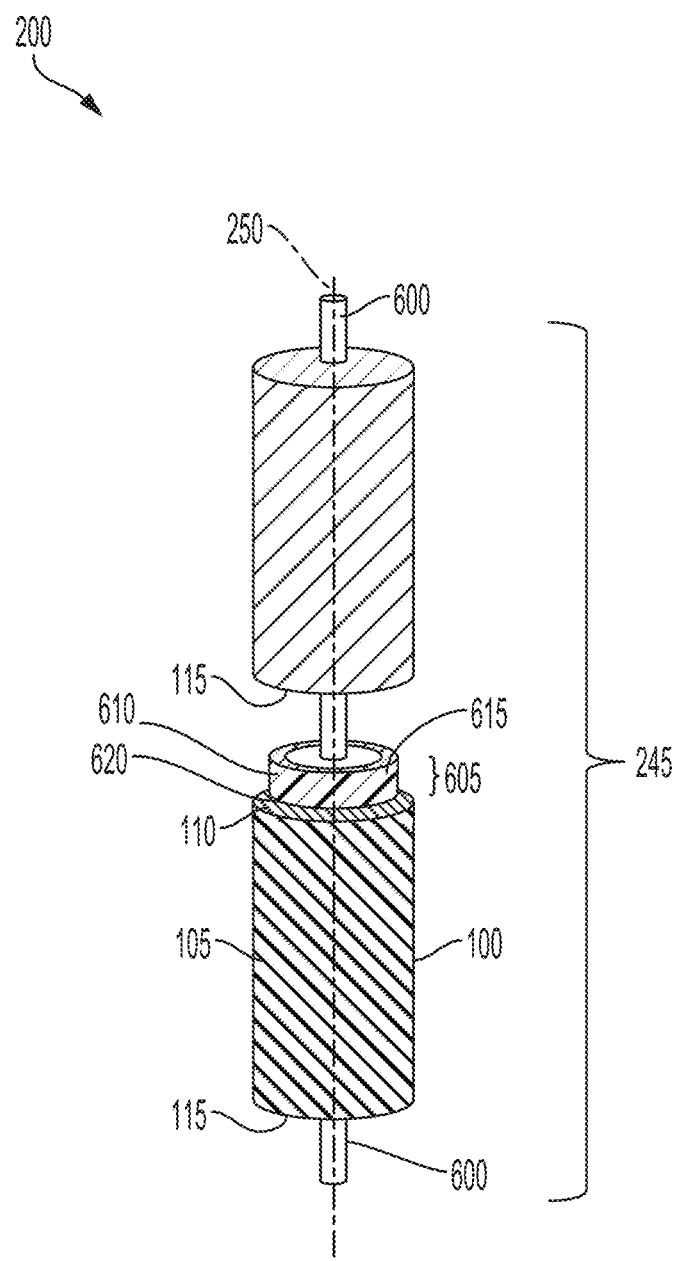
FIG. 6 depicts an oblique perspective view of an example battery cell array with a separator element.

FIG. 6, among others, depicts an oblique perspective view of the battery cell array 245 with a separator element 605. As shown, the cell array assembly 200 can have at least one bonding element 600 electrically coupling the stack structures 100 of the battery cell array 245. The bonding element 600 can be mechanically coupled with the stack structures 100 of the battery cell array 245. For example, as depicted, the bonding element 600 can pass through the stack structures 100 of the battery cell array 245. The bonding element 600 can correspond to any of the bonding elements 410, 430, 500, 505, or 510.

In addition, the cell array assembly 200 can have at least one separator element 605 (e.g., a washer). The separator element 605 can be part of the battery cell array 245. The separator element 605 can physically separate one stack structure 100 from anther stack structure 100 in the battery cell array 245. The separator element 605 can be disposed or arranged within the cavity 225 of the housing 205. The separator element 605 can be situated between a pair of the stack structures 100 of the battery cell array 245. The separator element 605 can be substantially aligned (e.g., within 15%) to with the stack structures 100 of the battery cell array 245 about the axis 250. The separator element 605 can be substantially perpendicular (e.g., between 80° and 100°) to the axis 250 defined through the housing 205 and the battery cell array 245.

The separator element 605 can be comprised of an electrically insulative material to prevent direct electric coupling between the stack structures 100 of the battery cell array 245. The electrically insulative and thermally conductive material for the separator element 605 can include a ceramic material (e.g., silicon nitride, titanium carbide, zirconium dioxide, beryllium oxide, and among others) and a thermoplastic material (e.g., polyethylene, polypropylene, polystyrene, polyvinyl chloride, or nylon), among others. The separator element 605 can be of any shape or dimension. The separator element 605 can be of any shape and dimension. The shape of separator element 605 can be prismatic with a polygonal base, such as a triangle, a rectangle, a square, a pentagon, a hexagon, or a nonagon, among others. The shape of the separator element 605 can be cylindrical with a circular (e.g., as depicted), an elliptical, or an ovular base, among others. The separator element 605 can have a length ranging between 0.05 mm to 15 mm. The separator element 605 can have a width (or diameter in cylindrical examples) ranging between 0.05 mm to 15 mm. The separator element 605 can have a height ranging between 0.05 mm to 15 mm.

The separator element 605 can have at least one longitudinal side 610, at least one top side 615, and at least one bottom side 620. The longitudinal side 610 can correspond to a portion of the separator element 605 spanning from one lateral side to another lateral side vertically (e.g., as depicted) or horizontally on the separator element 605. The top side 615 (sometimes referred herein as a first lateral side) can correspond to a top longitudinal portion of the separator element 605. The bottom side 620 (sometimes referred herein as a second lateral side) can correspond to a bottom longitudinal portion of the separator element 605, and can be opposite of the top side 615. The longitudinal side 610 can extend or span between the top side 615 and the bottom side 620 of the separator element 605. The longitudinal side 610 can be substantially perpendicular (e.g., between 80° and 100°) to the top side 615 or the bottom side 620. The separator element 605 can have or define an opening from the top side 615 to the bottom side 620 to pass the bonding element 600. The top side 615 of the separator element 605 can be flush or in contact with the bottom side 115 of one stack structure 100 disposed above the separator element 605. The bottom side 620 of the separator element 605 can be flush or in contact with the top side 110 of the stack structure 100 disposed below the separator element 605.

Figure 7:
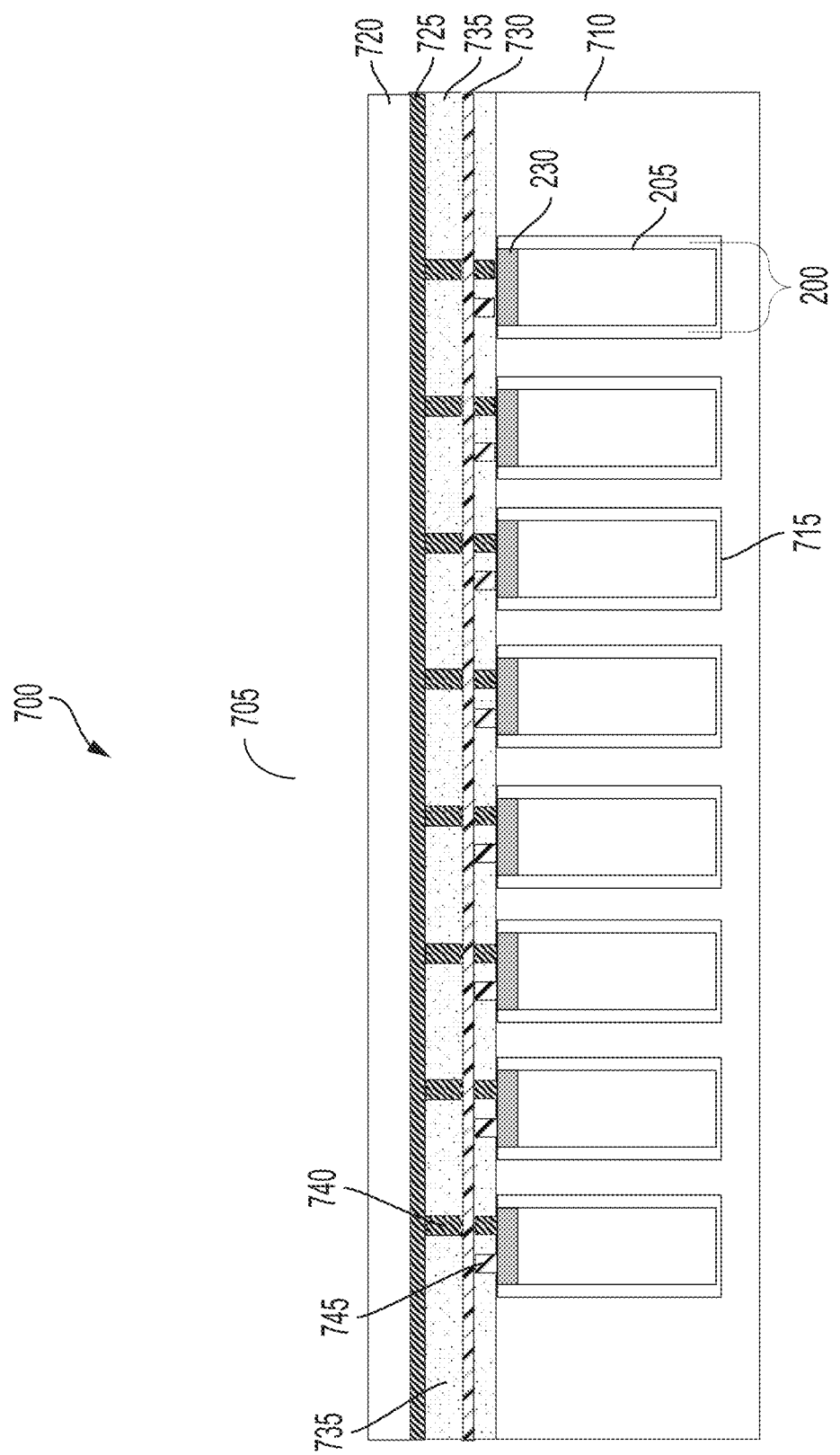
FIG. 7 depicts a cross-sectional view of a battery module of a system for powering an electric vehicle.

FIG. 7, among others, depicts a cross-section view of a battery module 705 of an apparatus or system 700 for powering electric vehicles. The apparatus or system 700 can include at least one battery module 705 (and each component of the battery module 705). The battery module 705 can hold a set of cell array assemblies 200 in an electric vehicle. The battery module 705 can be of any shape. The shape of the battery module 705 can be cylindrical with a circular, elliptical, or ovular base, among others. The shape of the battery module 705 can also be prismatic with a polygonal base, such as a triangle, a square, a rectangle (e.g., as depicted), a pentagon, and a hexagon, among others. The battery module 705 can have a length ranging between 10 cm to 200 cm. The battery module 705 can have a width ranging between 10 cm to 200 cm. The battery module 705 can have a height ranging between 65 mm to 100 cm.

The battery module 705 can include at least one battery case 710 and a covering element 720. The battery case 710 can be separated from the covering element 720. The battery case 710 can include or define a set of holders 715. Each holder 715 can be or include a hollowing or a hollow portion defined by the battery case 710. Each holder 715 can house, contain, store, or hold at least one cell array assembly 200. The cell array assembly 200 can include the housing 205, the capping element 220 mechanically coupled with the housing 205, and the components inserted within the housing 205. Each holder 715 can be in a various of orientations, such as horizontal, vertical (e.g., as depicted), or inclined. The cell array assembly 200 (including the housing 205, the capping element 220, and the battery cell array 245) held in the holder 715 can be in the same orientation as the holder 715. The cell array assembly 200 can be in a horizontal, vertical (e.g., as depicted), or inclined orientation. The battery case 710 can include at least one electrically or thermally conductive material, or combinations thereof. The battery case 710 can include at least one thermal control system (e.g., a cooling plate or a heat sink). Each thermal control system can be thermally coupled to at least one of the cell array assemblies 200. In this manner, the battery cell array 245 in each cell array assembly 200 can be thermally coupled with a single cooling system via the housing 205 to remove heat from the battery cell array 245. The covering element 720 can hold or secure the at least one cell array assembly 200 within each holder 715. At least one side (e.g., a bottom side) of the covering element 720 can be mechanically coupled with at least one side (e.g., a top side) of the battery case 710.

Between the battery case 710 and the covering element 720, the battery module 705 can include at least one positive current collector 725, at least one negative current collector 730, and at least one electrically insulative layer 735. The positive current collector 725 and the negative current collector 730 can each include an electrically conductive material to provide electrical power to other electrical components in the electric vehicle. The positive current collector 725 (sometimes referred herein as a positive busbar) can be connected or otherwise electrically coupled with the positive terminal 235 on the capping element 220 of each cell array assembly 200 housed in the set of holders 715 via a positive bonding element 740. One end of the positive bonding element 740 can be bonded, welded, connected, attached, or otherwise electrically coupled with the positive terminal 235 on the capping element 220 of each cell array assembly 200. The negative current collector 730 (sometimes referred herein as a negative busbar) can be connected or otherwise electrically coupled with the negative terminal 240 on the housing 205 of each cell array assembly 200 housed in the set of holders 715 via a negative bonding element 745. The negative bonding element 745 can be bonded, welded, connected, attached, or otherwise electrically coupled to the negative terminal 240 on the housing 205 of each cell array assembly 200.

The positive current collector 725 and the negative current collector 730 can be separated from each other by the electrically insulative layer 735. The electrically insulative layer 735 can include spacing to pass or fit the positive bonding element 740 connected to the positive current collector 725 and the negative bonding element 745 connected to the negative current collector 730. The electrically insulative layer 735 can partially or fully span the volume defined by the battery case 710 and the covering element 720. A top plane of the electrically insulative layer 735 can be in contact or be flush with a bottom plane of the covering element 720. A bottom plane of the electrically insulative layer 735 can be in contact or be flush with a top plane of the battery case 710. The electrically insulative layer 735 can include any electrically insulative material or dielectric material, such as air, nitrogen, sulfur hexafluoride ($SF_6$), ceramic, glass, and plastic (e.g., polysiloxane), among others to separate the positive current collector 725 from the negative current collector 730.

Figure 8:
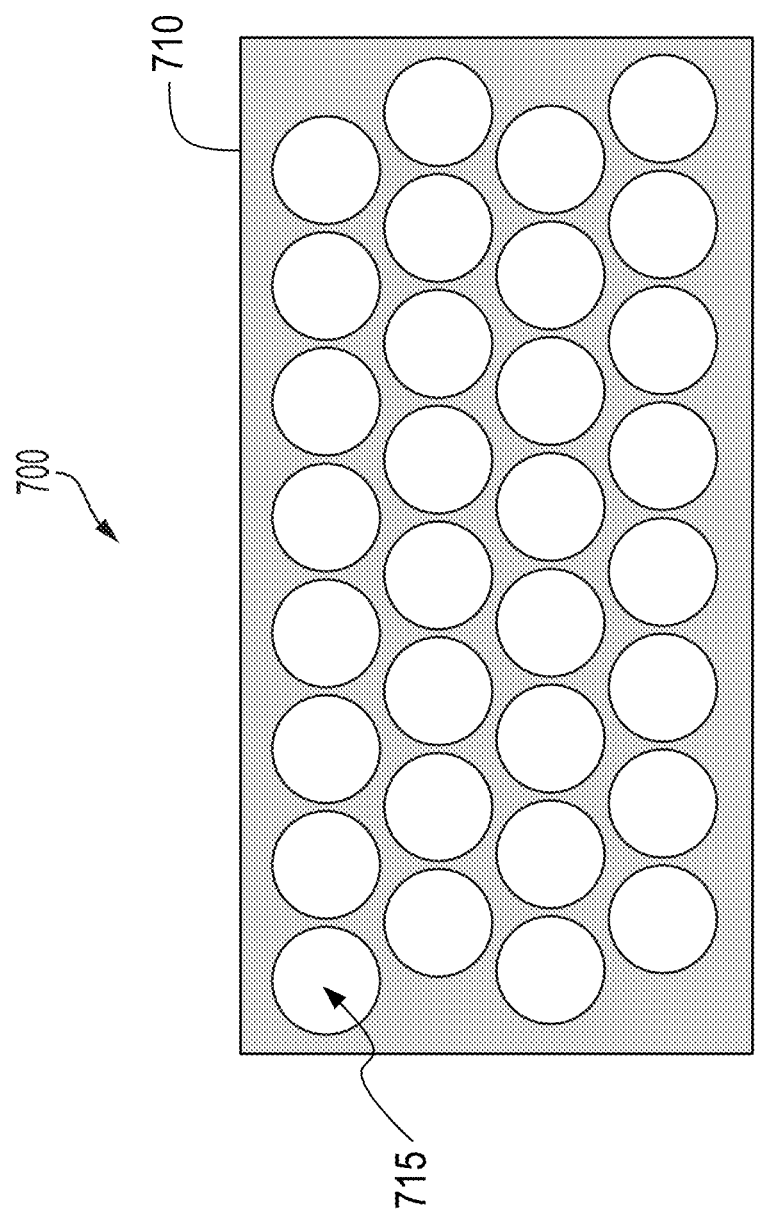
FIG. 8 depicts a top-down view of a battery module of a system for powering an electric vehicle.

FIG. 8, among others, depicts a top-down view of the battery case 710 of the battery module 705 of the apparatus or system 700 to power an electric vehicle. The battery module 705 can define or include a set of holders 715. The shape of each holder 715 can match a shape of the housing 205 of the battery cell 100. The shape of each holder 715 can be cylindrical with a circular (e.g., as depicted), elliptical, or ovular base, among others. The shape of each holder 715 can also be prismatic with a polygonal base, such as a triangle, a square, a rectangle, a pentagon, and a hexagon, among others. The shapes of each holder 715 can vary or can be uniform throughout the battery module 705. For example, some holders 715 can be hexagonal in shape, whereas other holders can be circular in shape. The dimensions of each holder 715 can be larger than the dimensions of the battery cell 100 housed therein. Each holder 715 can have a length ranging between 10 mm to 300 mm. Each holder 715 can have a width ranging between 10 mm to 300 mm. Each holder 715 can have a height (or depth) ranging between 65 mm to 100 cm.

Figure 9:
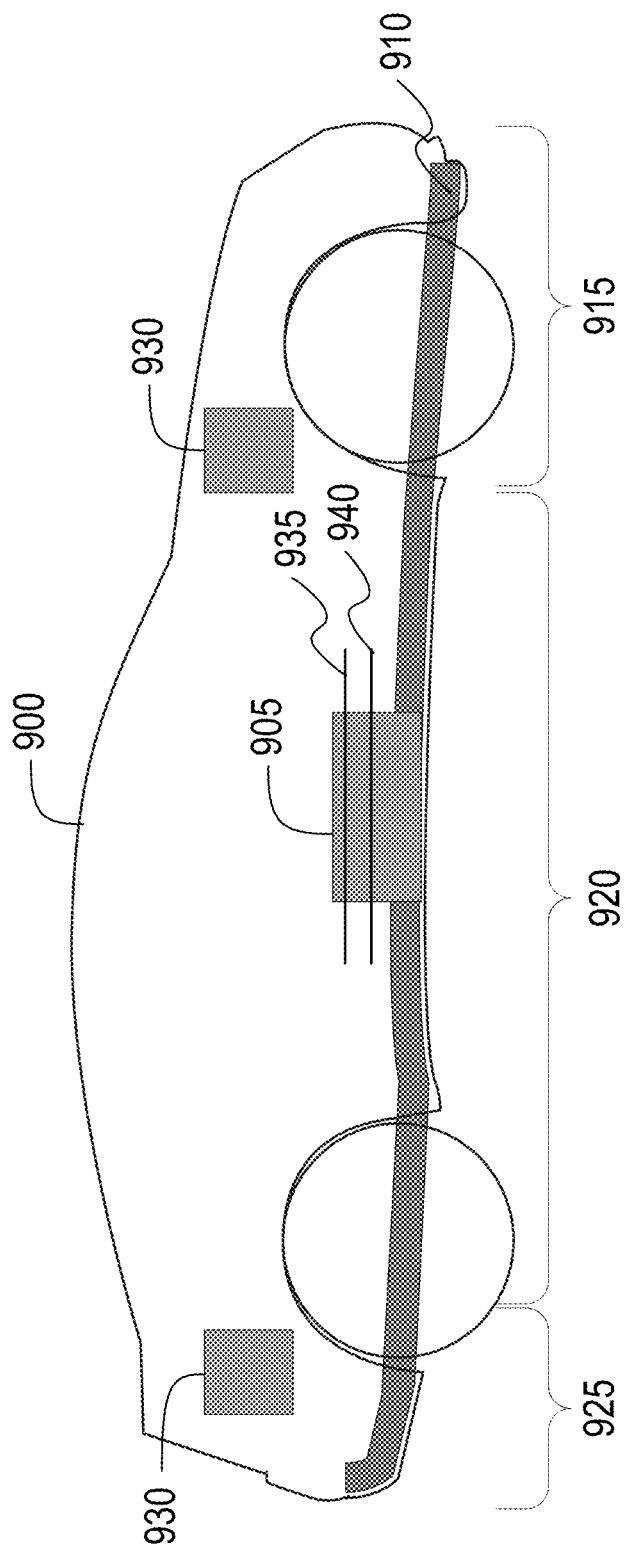
FIG. 9 depicts a cross-sectional view of an example electric vehicle installed with a battery pack.

FIG. 9, among others, depicts a cross-section view of an electric vehicle 900 installed with a battery pack 905. The electric vehicle 900 can be an electric automobile (e.g., as depicted), hybrid, a motorcycle, a scooter, a passenger vehicle, a passenger or commercial truck, and another type of vehicle such as sea or air transport vehicles, a plane, a helicopter, a submarine, a boat, or a drone, among others. The electric vehicle 900 can include at least one chassis 910 (e.g., a frame, internal frame, or support structure). The chassis 910 can support various components of the electric vehicle 900. The chassis 910 can span a front portion 915 (e.g., a hood or bonnet portion), a body portion 920, and a rear portion 925 (e.g., a trunk portion) of the electric vehicle 900. The battery pack 905 can be installed or placed within the electric vehicle 900. The battery pack 905 can be installed on the chassis 910 of the electric vehicle 900 within the front portion 915, the body portion 920 (e.g., as depicted in FIG. 9 between the front portion 915 and the rear portion 925), or the rear portion 925.

The electric vehicle 900 can include at least one battery pack 905. The battery pack 905 can be part of the system 200. The battery pack 905 can be part of the apparatus or system 700. The battery pack 905 can house, contain, or otherwise include a set of one or more battery modules 705, among other components. The number of battery modules 705 in the battery pack 905 can range between 1 and 24, for example. The battery pack 905 can be of any shape. The shape of battery pack 905 can be cylindrical with a circular, elliptical, or ovular base, among others. The shape of battery pack 905 can also be prismatic with a polygonal base, such as a triangle, a square, a rectangle (e.g., as depicted), a pentagon, and a hexagon, among others. The battery pack 905 can have a length ranging between 100 cm to 500 cm. The battery pack 905 can have a width ranging between 100 cm to 400 cm. The battery pack 905 can have a height ranging between 70 mm to 1000 mm.

The electric vehicle 900 can include one or more components 930. The one or more components 930 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 930 can be installed in the front portion 915, the body portion 920, or the rear portion 925 of the electric vehicle 900. The battery pack 905 installed in the electric vehicle 900 can provide electrical power to the one or more components 930 via at least one positive current collector 935 and at least one negative current collector 940. The positive current collector 935 and the negative current collector 940 can be connected or otherwise be electrically coupled to other electrical components of the electric vehicle 900 to provide electrical power. The positive current collector 935 (e.g., a positive busbar) can be connected or otherwise electrically coupled with each positive current collector 725 of each battery module 705 in the battery pack 905. The negative current collector 940 (e.g., a negative busbar) can be connected or otherwise electrically coupled with each negative current collector 730 of each battery module 705 in the battery pack 905.

Figure 10:
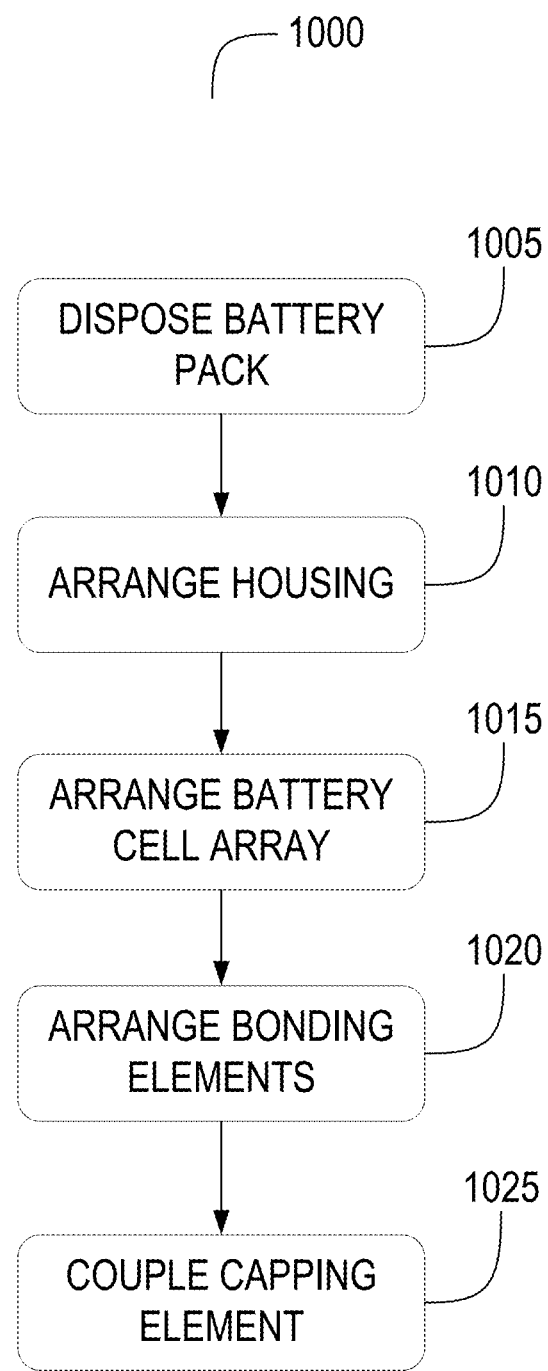
FIG. 10 depicts a flow diagram of an example method of assembling battery cells for battery packs for electric vehicles.

FIG. 10, among others, depicts a flow diagram of a method 1000 of assembling a system to power electric vehicles. The functionalities of the method 1000 can be implemented or performed using any of the components detailed above in conjunction with FIGS. 1-9. The method 1000 can include disposing a battery pack 905 (ACT 1005). The battery pack 905 can be installed, arranged, or otherwise disposed in an electric vehicle 900. The battery pack 905 can house, contain, or include a set of battery modules 705. The battery pack 905 can store electrical power for one or more components 930 of the electric vehicle 900. The battery pack 905 can provide electrical power to the one or more components 930 via a positive current collector 935 and a negative current collector 940.

The method 1000 can include arranging a housing 205 (ACT 1010). The housing 205 can be placed, disposed, or arranged in one of the holders 715 of the battery module 705. The housing 205 can be formed (e.g., molding and casting) from a cylindrical casing with a circular, ovular, or elliptical base or from a prismatic casing with a polygonal base. The housing 205 can have a sidewall 210 and a covering element 215. The sidewall 210 and the covering element 215 can be formed from the cylindrical or prismatic casing. The covering element 215 can be bonded (e.g., welded, attached, brazed, or connected) with one end of the sidewall 210 of the housing 205. The housing 205 can function as a negative terminal 240.

The method 1000 can include arranging a battery cell array 245 (ACT 1015). The battery cell array 245 can include a set of stack structures 100. Each stack structure 100 can have a positive electrode 120, a negative electrode 125, and a separator 130. The positive electrode 120 can define a positive terminal of the stack structure 100. The negative electrode 125 can define a negative terminal of the stack structure 100. The positive electrode 120, the negative electrode 125, and the separator 130 can be wrapped, enfolded, bound, adhered, or otherwise packaged into the stack structure 100. Multiple stack structures 100 can be arranged in series or in succession (e.g., vertically, horizontally, or on an incline) to form the battery cell array 245. The battery cell array 245 can be placed or inserted into the cavity 225 defined by the housing 205. Placed into the cavity 225, the battery cell array 245 can be supported or in contact with the covering element 215.

The method 1000 can include arranging a bonding element (e.g., 410, 430, 500, 505, 510, and 600) (ACT 1020). One or more bonding elements can be mechanically coupled (e.g., fastened, attached, welded, brazed, or in contact) with the stack structures 100 of the battery cell array 245. At least one of the bonding element scan be mechanically with the terminal of at least one of the stack structures 100 along a longitudinal side 105, a top side 110, a bottom side 115, or an interior portion of the stack structure 100. By mechanically coupling with the stack structures 100, the bonding elements can electrically couple the stack structures 100 in series, parallel, or combination of series and parallel. One end of at least one of the bonding element can be electrically coupled with the positive terminal 235 of the cell array assembly 200. To electrically couple, one end of at least one of the bonding element can be mechanically coupled with at least a portion of a capping element 220. One end of at least one of the bonding element can be electrically coupled with the negative terminal 240 of the cell array assembly 200. To electrically couple, one end of at least one of the bonding element can be mechanically coupled with at least a portion of the housing 205 or the cover element 215.

The method 1000 can include coupling a capping element 230 (ACT 1025). The capping element 230 can be mechanically coupled (e.g., fastened, attached, welded, brazed, crimped, or in contact) with the opening 220 of the housing 205 opposite of the cover element 215. The capping element 220 can cover or hold the battery array cell 245 arranged in the cavity 225. The capping element 230 can be electrically coupled with one terminal of at least one of the stack structures 100 in the battery cell array 245 to form the positive terminal 235.

Figure 11:
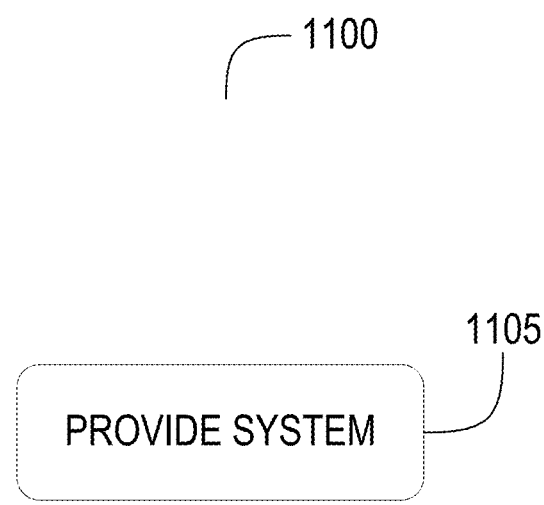
FIG. 11 depicts a flow diagram of an example of method of providing battery cells for battery packs for electric vehicles.

FIG. 11, among others, depicts a flow diagram of a method 1100 of assembling a system to power electric vehicles. The functionalities of the method 1100 can be implemented or performed using any of the components detailed above in conjunction with FIGS. 1-9. The method 1100 can including providing a system 700 (ACT 1105). The system 700 can include a battery pack 905. The battery pack 905 can be installed in an electric vehicle 900 to power the electric vehicle 900. The system can include a housing 205. The housing 205 can be arranged in the battery pack 905. The housing 205 can have a cavity 225. At least a portion of the housing 205 itself can have a negative terminal 240. The system 700 can include a capping element 230. The capping element 230 can be mechanically coupled with the housing 205. At least a portion of capping element 230 can have a positive terminal 235. The system 700 can include a battery cell array 245. The battery cell array 245 can be arranged in the cavity 225 of the housing 205. The battery cell array 245 can have a positive terminal 400. The positive terminal 400 of the battery cell array 245 can be electrically coupled with the positive terminal 235. The battery cell array 245 can have a negative terminal 405. The negative terminal 405 of the battery cell array 245 can be electrically coupled with the negative terminal 240. The battery cell array 245 can have a set of stack structures 100. Each stack structure 100 can have a portion (e.g., the positive electrode 120 or the positive tab 135) corresponding to a positive terminal of each stack structure 100. Each stack structure 100 can have a portion (e.g., the negative electrode 125 or the negative tab 140) corresponding to a negative terminal of each stack structure 100. The terminals of all the stack structures 100 can be electrically coupled with one another, the positive terminal 400, or the negative terminal 405 to connect the stack structures 100 in a series or parallel configuration.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery pack disposed in an electric vehicle to power the electric vehicle, comprising:
    a housing having a cavity, at least a portion of the housing defining a first polarity terminal;
    a capping element mechanically coupled with the housing, the capping element having a second polarity terminal opposite in polarity of the first polarity terminal of the housing;
    a battery cell array arranged within the cavity of the housing, the battery cell array having:
        a first polarity terminal for the battery cell array electrically coupled with the first polarity terminal of the housing;
        a second polarity terminal for the battery cell array electrically coupled with the second polarity terminal of the capping element;
        a first stack structure having a top side and a bottom side, the top side of the first stack structure having a first polarity terminal of the first stack structure, the bottom side of the first stack structure having a second polarity terminal of the first stack structure, the first polarity terminal of the first stack structure electrically coupled with the first polarity terminal for the battery cell array;
        a second stack structure having a top side and a bottom side, the second stack structure axially aligned with the first stack structure within the cavity of the housing, the top side of the second stack structure having a first polarity terminal of the second stack structure, the bottom side of the second stack structure having a second polarity terminal of the second stack structure, the second polarity terminal of the second stack structure electrically coupled with the second polarity terminal for the battery cell array;
        the second polarity terminal of the first stack structure electrically coupled with one of the first polarity terminal of the second stack structure or the second polarity terminal of the capping element via the second polarity terminal for the battery cell array; and
        the first polarity terminal of the second stack structure electrically coupled with at least one of the second polarity of the first stack structure or the first polarity terminal for the battery cell array.

2. The battery pack of claim 1, comprising:
    a bonding element arranged within the cavity of the housing for the battery cell array to electrically couple the battery cell array in parallel, the bonding element having:
        a body passing through the top side of the first stack structure and electrically coupled with the first polarity terminal of the first stack structure;
        a first end electrically coupled with the first polarity terminal for the battery cell array; and
        a second end electrically coupled with the first polarity terminal of the second stack structure.

3. The battery pack of claim 1, comprising:
    a bonding element arranged within the cavity of the housing for the battery cell array to electrically couple the battery cell array in parallel, the bonding element having:
        a body mechanically coupled with the bottom side of the first stack structure and with the bottom side of the second stack structure, the body electrically coupled with the second polarity terminal of the first stack structure and with the second polarity terminal of the second stack structure; and
        an end electrically coupled with the second polarity terminal for the battery cell array.

4. The battery pack of claim 1, comprising:
    a plurality of bonding elements arranged within the cavity of the housing for the battery cell array to electrically couple the battery cell array in series, having:
        a first bonding element to electrically couple the first polarity terminal for the battery cell array and the first polarity terminal of the first stack structure;

a second bonding element to electrically couple the second polarity terminal of the first stack structure and the first polarity terminal of the second stack structure; and a third bonding element to electrically couple the second polarity terminal of the first stack structure with the second polarity terminal for the battery cell array.

5. The battery pack of claim 1, comprising:
at least a portion of the top side of the first stack structure having the first polarity terminal, the top side of the first stack structure mechanically coupled with a first bonding element to electrically couple with the first polarity terminal for the battery cell array;
at least a portion of the bottom side of the first stack structure having the second polarity terminal, the bottom side of the first stack structure mechanically coupled with a second bonding element to electrically couple the battery cell array in series;
at least a portion of the top side of the second stack structure having the first polarity terminal, the top side of the second stack structure mechanically coupled with the first bonding element to electrically couple the second polarity terminal of the first stack structure and the first polarity terminal of the second stack structure; and
at least a portion of the bottom side of the second stack structure having the second polarity terminal, the bottom side of the second stack structure mechanically coupled with a third bonding element to electrically couple with the second polarity terminal for the battery cell array.

6. The battery pack of claim 1, comprising:
the first stack structure lacking a casing and including a first polarity layer electrically coupled with the first polarity terminal of the first stack structure, a second polarity layer electrically coupled with the second polarity terminal of the first stack structure, and a separator layer to transfer ions between the first polarity layer and the second polarity layer; and
the second stack structure lacking a casing and including a first polarity layer electrically coupled with the first polarity terminal of the second stack structure, a second polarity layer electrically coupled with the second polarity terminal of the second stack structure, and a separator layer to transfer ions between the first polarity layer and the second polarity layer.

7. The battery pack of claim 1, comprising:
the housing having a longitudinal surface partially defining the cavity of the housing, the longitudinal surface having an indentation laterally spanning the longitudinal surface, the indentation separating the first stack structure and the second stack structure of the battery array arranged within the cavity of the housing.

8. The battery pack of claim 1, comprising:
a separator element arranged within the cavity of the housing, the separator element mechanically coupled with the top side of the second stack structure to physically separate the first stack structure and the second stack structure.

9. The battery pack of claim 1, comprising:
a support element arranged on a longitudinal surface of the cavity of the housing between the bottom side of the first stack structure and the top side of the second stack structure of the battery array to physically separate the first stack structure and the second stack structure.

10. The battery pack of claim 1, comprising:
the battery cell array thermally coupled with a single cooling system via the housing to transfer heat away from the first stack structure and from the second stack structure.

11. The battery pack of claim 1, comprising:
the housing having an orientation in at least one of a horizontal orientation or a vertical orientation in the battery pack, the battery cell array arranged within the cavity in the orientation as same as the housing.

12. The battery pack of claim 1 installed in the electric vehicle to power one or more components of the electric vehicle.

13. A method of assembling battery packs, comprising:
disposing a battery pack in an electric vehicle to power the electric vehicle;
arranging, in the battery pack, a housing having a cavity, at least a portion of the housing defining a first polarity terminal;
mechanically coupling a capping element with the housing, the capping element having a second polarity terminal opposite in polarity of the first polarity terminal of the housing;
arranging, within the cavity of the housing, a battery cell array having:
a first polarity terminal for the battery cell array electrically coupled with the first polarity terminal of the housing;
a second polarity terminal for the battery cell array electrically coupled with the second polarity terminal of the capping element;
a first stack structure having a top side and a bottom side, the top side of the first stack structure having a first polarity terminal of the first stack structure, the bottom side of the first stack structure having a second polarity terminal of the first stack structure, the first polarity terminal of the first stack structure electrically coupled with the first polarity terminal for the battery cell array;
a second stack structure having a top side and a bottom side, the second stack structure axially aligned with the first stack structure within the cavity of the housing, the top side of the second stack structure having a first polarity terminal of the second stack structure, the bottom side of the second stack structure having a second polarity terminal of the second stack structure, the second polarity terminal of the second stack structure electrically coupled with the second polarity terminal for the battery cell array;
the second polarity terminal of the first stack structure electrically coupled with one of the first polarity terminal of the second stack structure or the second polarity terminal of the capping element via the second polarity terminal for the battery cell array; and
the first polarity terminal of the second stack structure electrically coupled with at least one of the second polarity of the first stack structure or the first polarity terminal for the battery cell array.

14. The method of claim 13, comprising:
arranging, within the cavity of the housing, a first bonding element to electrically couple the battery cell array in parallel, the first bonding element having:
a body of the first bonding element passing through the top side of the first stack structure and electrically coupled with the first polarity terminal of the first stack structure;

a first end of the first bonding element electrically coupled with the first polarity terminal for the battery cell array; and
a second end of the first bonding element electrically coupled with the first polarity terminal of the second stack structure; and
arranging, within the cavity of the housing, a second bonding element to electrically couple the battery cell array in parallel, the second bonding element having:
a body of the second bonding element mechanically coupled with the bottom side of the first stack structure and with the bottom side of the second stack structure, the body electrically coupled with the second polarity terminal of the first stack structure and with the second polarity terminal of the second stack structure; and
an end of second bonding element electrically coupled with the second polarity terminal for the battery cell array.

15. The method of claim 13, comprising:
arranging, within the cavity of the housing, a plurality of bonding elements to electrically couple the battery cell array in series, the plurality of bonding elements having:
a first bonding element to electrically couple the first polarity terminal for the battery cell array and the first polarity terminal of the first stack structure;
a second bonding element to electrically couple the second polarity terminal of the first stack structure and the first polarity terminal of the second stack structure; and
a third bonding element to electrically couple the second polarity terminal of the first stack structure with the second polarity terminal for the battery cell array.

16. The method of claim 13, comprising:
arranging, on a longitudinal surface of the cavity, a support element between the bottom side of the first stack structure and the top side of the second stack structure of the battery array to physically separate the first stack structure and the second stack structure.

17. An electric vehicle, comprising:
one or more components;
a battery pack to power the one or more components;
a housing arranged in the battery pack, the housing having a cavity, at least a portion of the housing defining a first polarity terminal;
a capping element mechanically coupled with the housing, the capping element having a second polarity terminal opposite in polarity of the first polarity terminal of the housing;
a battery cell array arranged within the cavity of the housing, the battery cell array having:
a first polarity terminal for the battery cell array electrically coupled with the first polarity terminal of the housing;
a second polarity terminal for the battery cell array electrically coupled with the second polarity terminal of the capping element;
a first stack structure having a top side and a bottom side, the top side of the first stack structure having a first polarity terminal of the first stack structure, the bottom side of the first stack structure having a second polarity terminal of the first stack structure, the first polarity terminal of the first stack structure electrically coupled with the first polarity terminal for the battery cell array;
a second stack structure having a top side and a bottom side, the second stack structure axially aligned with the first stack structure within the cavity of the housing, the top side of the second stack structure having a first polarity terminal of the second stack structure, the bottom side of the second stack structure having a second polarity terminal of the second stack structure, the second polarity terminal of the second stack structure electrically coupled with the second polarity terminal for the battery cell array;
the second polarity terminal of the first stack structure electrically coupled with one of the first polarity terminal of the second stack structure or the second polarity terminal of the capping element via the second polarity terminal for the battery cell array; and
the first polarity terminal of the second stack structure electrically coupled with at least one of the second polarity of the first stack structure or the first polarity terminal for the battery cell array.

18. The electric vehicle of claim 17, comprising:
a first bonding element arranged within the cavity of the housing for the battery cell array to electrically couple the battery cell array in parallel, the first bonding element having:
a body of the first bonding element passing through the top side of the first stack structure and electrically coupled with the first polarity terminal of the first stack structure;
a first end of the first bonding element electrically coupled with the first polarity terminal for the battery cell array; and
a second end of the first bonding element electrically coupled with the first polarity terminal of the second stack structure; and
a second bonding element arranged within the cavity of the housing for the battery cell array to electrically couple the battery cell array in parallel, the bonding element having:
a body of the second bonding element mechanically coupled with the bottom side of the first stack structure and with the bottom side of the second stack structure, the body electrically coupled with the second polarity terminal of the first stack structure and with the second polarity terminal of the second stack structure; and
an end of the second bonding element electrically coupled with the second polarity terminal for the battery cell array.

19. The electric vehicle of claim 17, comprising:
a bonding element arranged within the cavity of the housing for the battery cell array to electrically couple the battery cell array in parallel, the bonding element having:
a body mechanically coupled with the bottom side of the first stack structure and with the bottom side of the second stack structure, the body electrically coupled with the second polarity terminal of the first stack structure and with the second polarity terminal of the second stack structure; and
an end electrically coupled with the second polarity terminal for the battery cell array.

* * * * *